US010473027B2

(12) United States Patent
O'Neill

(10) Patent No.: US 10,473,027 B2
(45) Date of Patent: Nov. 12, 2019

(54) ASYMMETRIC CAM TRANSMISSION WITH COAXIAL COUNTER-ROTATING OUTPUT SHAFTS

(71) Applicant: James L. O'Neill, Lakeville, MA (US)

(72) Inventor: James L. O'Neill, Lakeville, MA (US)

( * ) Notice: Subject to any disclaimer, the term of this patent is extended or adjusted under 35 U.S.C. 154(b) by 0 days.

(21) Appl. No.: 15/851,046

(22) Filed: Dec. 21, 2017

(65) Prior Publication Data
US 2018/0156108 A1 Jun. 7, 2018

Related U.S. Application Data

(63) Continuation-in-part of application No. 14/999,177, filed on Apr. 8, 2016.

(60) Provisional application No. 62/708,439, filed on Dec. 11, 2017.

(51) Int. Cl.
| | |
|---|---|
| F02B 75/32 | (2006.01) |
| F16H 25/14 | (2006.01) |
| F16H 53/02 | (2006.01) |
| F01B 9/06 | (2006.01) |
| F16H 53/06 | (2006.01) |

(52) U.S. Cl.
CPC ............ F02B 75/32 (2013.01); F01B 9/06 (2013.01); F16H 25/14 (2013.01); F16H 53/02 (2013.01); *F01B 2009/066* (2013.01); *F01B 2009/068* (2013.01); *F16H 53/06* (2013.01)

(58) Field of Classification Search
CPC .. F02B 25/32; F01B 9/06; F16H 25/14; F16H 53/02; F16H 53/06
See application file for complete search history.

(56) References Cited

U.S. PATENT DOCUMENTS

| | | | | |
|---|---|---|---|---|
| 1,374,164 A | * | 4/1921 | Nordwickhenrya | F01B 9/06 123/54.3 |
| 1,630,273 A | * | 5/1927 | Nordwickhenrya | F01B 9/06 123/197.1 |
| 1,863,877 A | * | 6/1932 | Rightenour | F01B 9/06 123/55.1 |
| 2,006,498 A | * | 7/1935 | Dasset | F01B 9/06 123/197.4 |
| 3,034,363 A | * | 5/1962 | Vogel | F02M 59/102 74/55 |
| 3,964,450 A | * | 6/1976 | Lockshaw | F01B 1/0613 123/54.3 |
| 4,301,776 A | * | 11/1981 | Fleming | F01B 9/06 123/197.1 |
| 6,073,516 A | * | 6/2000 | Westerlund | F16H 25/14 74/569 |
| 6,098,478 A | * | 8/2000 | Sandrock | B25J 9/109 74/53 |
| 7,219,631 B1 | * | 5/2007 | O'Neill | F01B 1/062 123/44 R |

(Continued)

*Primary Examiner* — Zakaria Elahmadi

(74) *Attorney, Agent, or Firm* — Barlow Josephs and Holmes Ltd; Stephen Holmes

(57) ABSTRACT

A drive transmission, having two counter-rotating cams bearing-mounted within a housing about a rotational axis. The counter-rotating cams have asymmetrical lobe profiles which are operative to drive a corresponding pair of coaxial drive shafts in opposite directions along the rotational axis. The asymmetry of the lobe profiles prevents the cams from locking when the lobe apexes pass the top and bottom dead center positions relative to the follower or drive pins.

7 Claims, 21 Drawing Sheets

(56) References Cited

U.S. PATENT DOCUMENTS

| | | | |
|---|---|---|---|
| 9,702,273 B2* | 7/2017 | Cobb | F01B 9/06 |
| 2009/0314232 A1* | 12/2009 | Howell-Smith | F01B 1/0624 |
| | | | 123/55.2 |
| 2011/0180050 A1* | 7/2011 | Terry | F01B 9/06 |
| | | | 123/572 |
| 2014/0318483 A1* | 10/2014 | Shutlar | F01B 1/08 |
| | | | 123/55.3 |
| 2015/0122060 A1* | 5/2015 | Cui | F16H 25/14 |
| | | | 74/89 |
| 2017/0328277 A1* | 11/2017 | Ardezzone | F01B 1/12 |

* cited by examiner

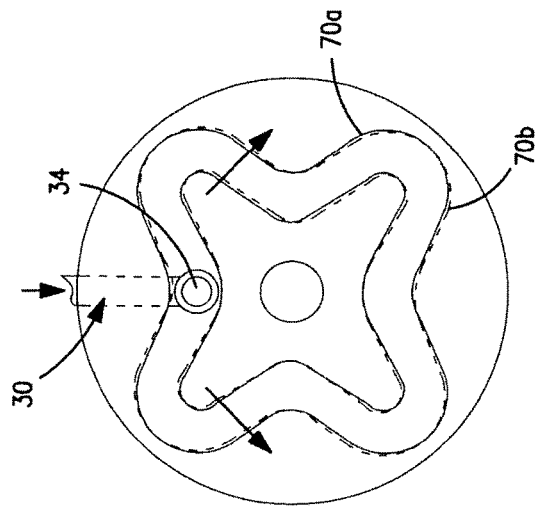
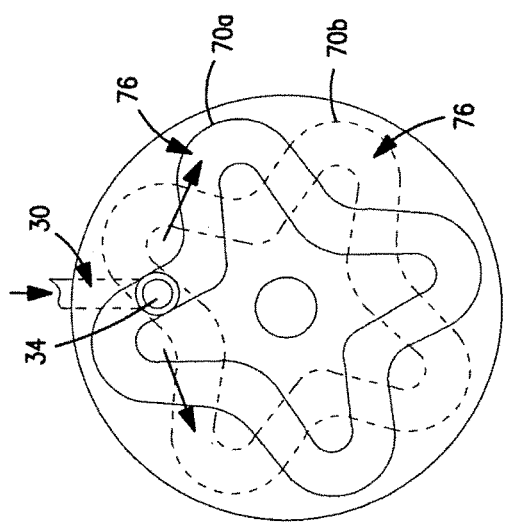
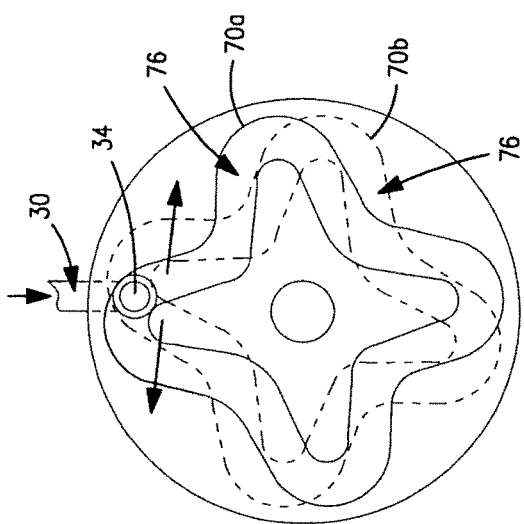
Figure 8a
Figure 8b
Figure 8c

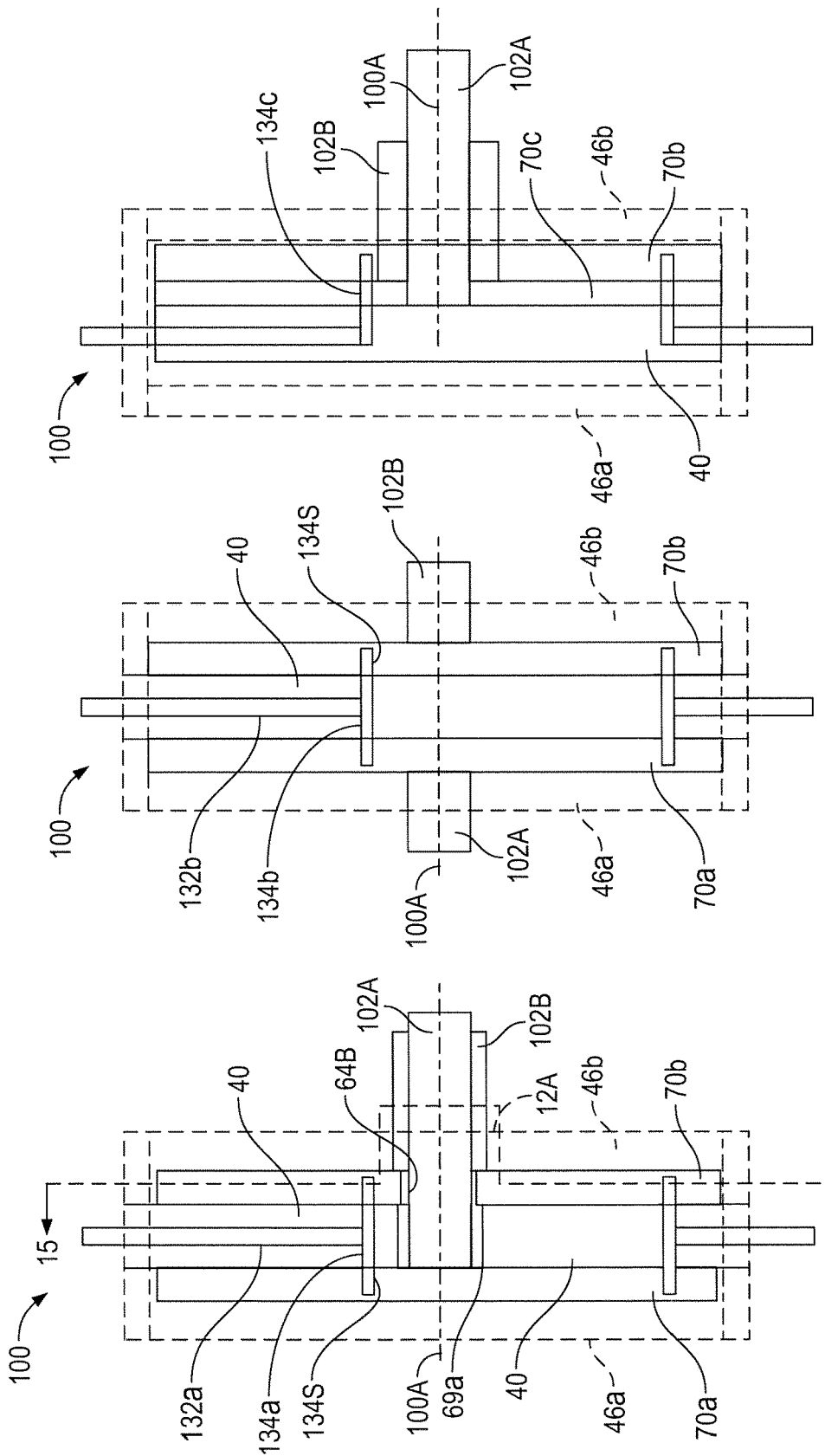

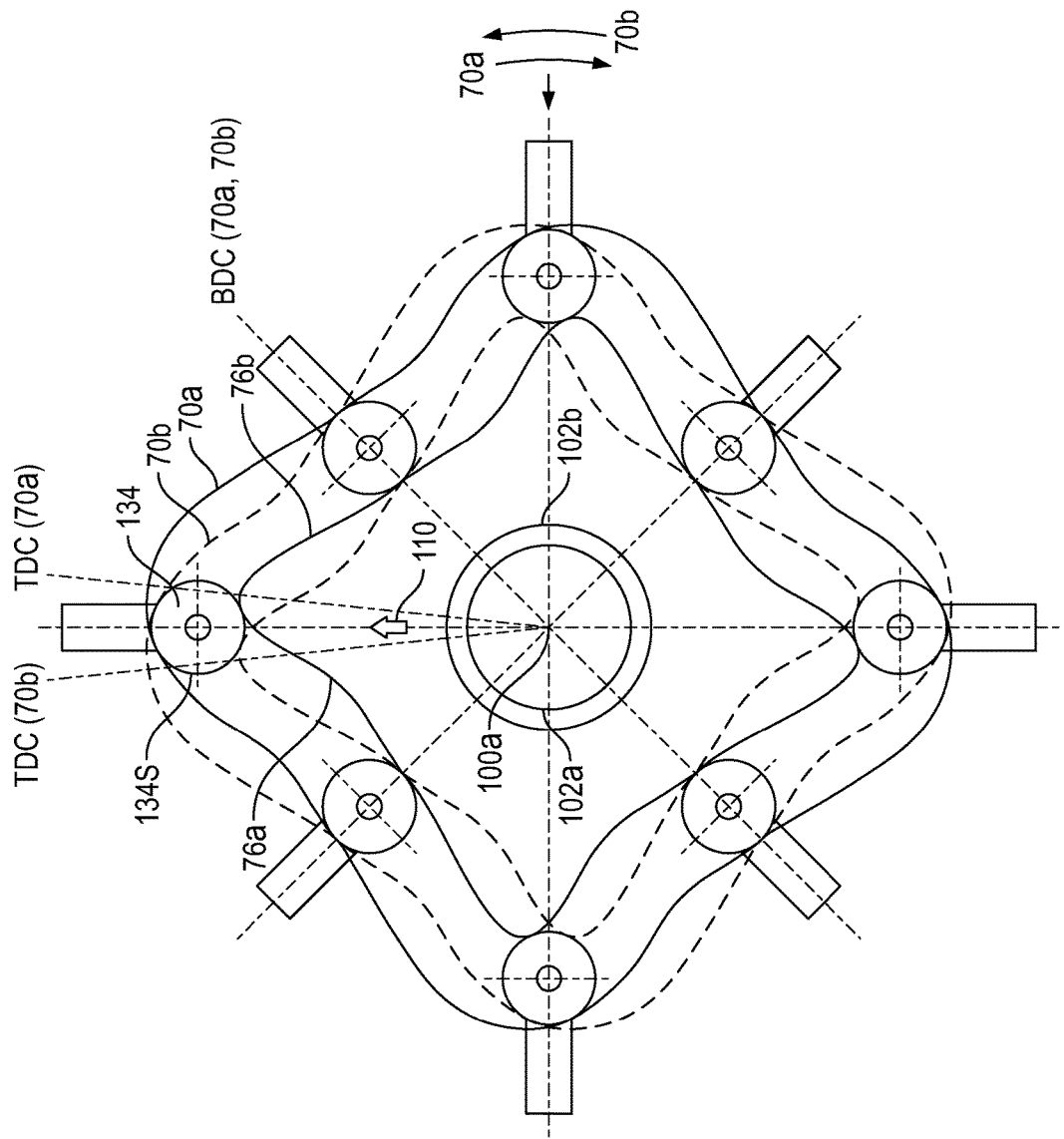

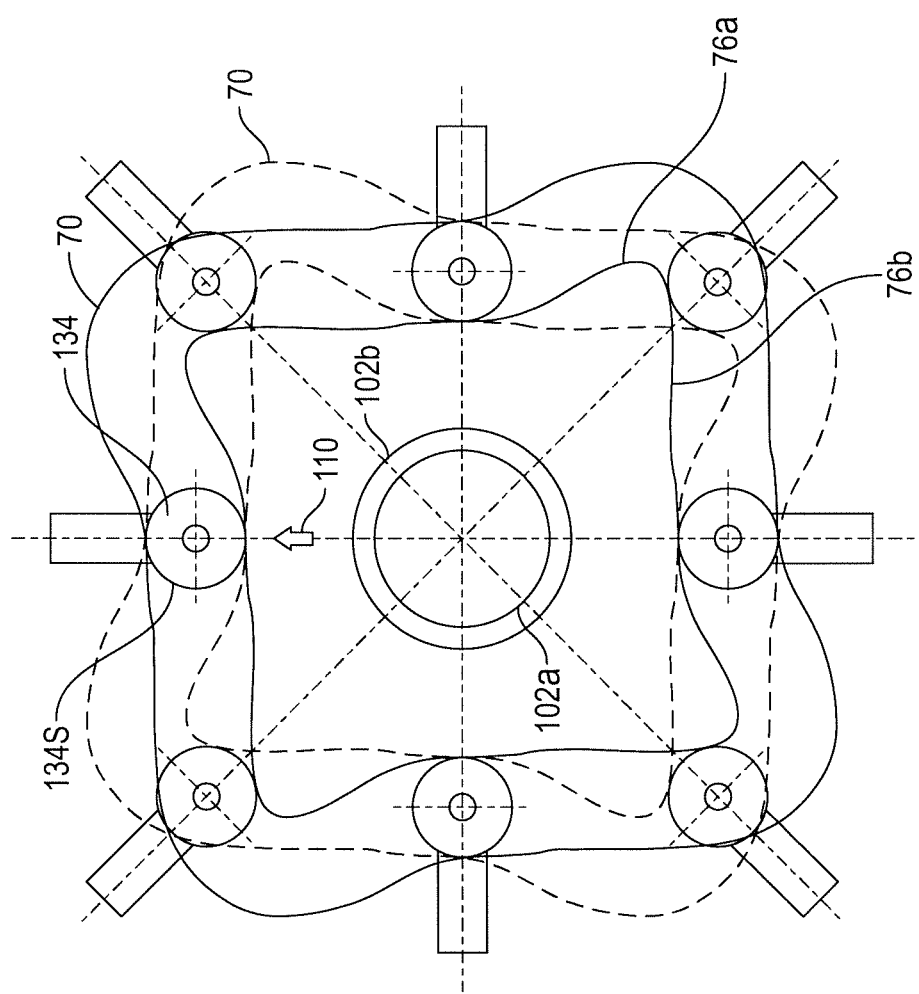

ASYMMETRIC CAM TRANSMISSION WITH COAXIAL COUNTER-ROTATING OUTPUT SHAFTS

CROSS-REFERENCE TO RELATED APPLICATIONS

This application is a continuation-in-part of U.S. application Ser. No. 14/999,177, filed Apr. 8, 2016. This application also claims the benefit of US Provisional Application No. 62/708,439 filed Dec. 11, 2017, the entire contents of which are incorporated herein by reference.

TECHNICAL FIELD

This invention is directed to internal combustion engines and drive train systems, and more particularly, to internal combustion engines employing a torque drive transmission employing a drive cam converting linear motion of a piston/cylinder into rotational motion of an output drive shaft. The engine and drive train maximizes energy conversion, eliminates the need for intermediate speed reduction devices, improves performance, enhances reliability and reduces mechanical complexity.

BACKGROUND

Designers of power output devices, e.g., automobile, aircraft and locomotive engines/drive trains, are faced with a myriad of competing design criteria that result in various design compromises. For example, to optimize power output, a compromise in engine torque is often necessary. Similarly, when optimal energy conversion is desired, e.g., specific fuel consumption, a designer must choose an appropriate air-standard combustion cycle to match the requirement. In yet other examples, if it is desirable to optimize horsepower and torque, one may need to accept weight and/or fuel consumption penalties.

While there are literally thousands of internal combustion engine designs and variations thereof, all employ certain fundamental or basic principles. These include: (i) the intake of a combustible mixture, e.g., oxygen and gasoline, into a working volume (ii) compression of the combustible mixture, (iii) ignition of the mixture to effect its expansion, (iv) capturing the energy in the expansion to produce work, and (v) expelling combustion by-products into an exhaust system so as to prepare the working volume for a subsequent combustion cycle.

Internal Combustion Engines (ICEs)

Commercially viable internal combustion engines include reciprocating-piston, rotary, and gas-turbine type engines. The following is a brief discussion of each followed by the advantages and disadvantages of each. Applications of each are also discussed.

Traditional reciprocating internal combustion engines employ the reciprocating motion of a piston/cylinder to perform the functions described above. Linear motion of the piston is translated into rotational motion by means of a piston rod that is articulately mounted to the underside of the piston at one end thereof and pivotally mounted at the other end to an eccentric portion of a crankshaft. Generally, these internal combustion engines employ the Clerk two-stroke, Otto four-stroke or Diesel two and/or four-stroke air-standard cycles.

A Clerk two-stroke engine typically employs a piston/cylinder arrangement wherein the cylinder comprises inlet and exhaust ports located on opposite sides of the cylinder walls. The inlet port is located slightly above the lowest point of piston travel, e.g., bottom dead center, and the exhaust port is located on the opposing side about midway relative to the piston travel. The combustible mixture is first introduced into the cylinder chamber as the piston uncovers the inlet port. The downward motion of the piston from the prior stroke, causes the combustible mixture (located within the housing) to be pressurized thus being forced into the cylinder chamber. As the piston moves upwardly and past the exhaust port, the combustible mixture is compressed and ignited upon reaching the top of the piston's stroke, i.e., top dead center. The expansion of the combustible mixture produces a downward power stroke and, upon passing the exhaust port, begins to be expelled from the cylinder chamber. As the piston travels downward yet further, the combustible mixture is pressurized by the chamber along the underside of the piston (traveling downwardly). This small quantity of pressurized air-fuel is injected into the cylinder as the piston passes the inlet port. The injection of this pressurized air-fuel mixture augments the expulsion of exhaust gases through the exhaust port and a new cycle begins. The Clerk two-stroke produces a power stroke for every two-strokes of the piston, or once per revolution, i.e., of the drive shaft. For equivalent displacement, the Otto cycle produces more power per stroke than the Clerk, but the Clerk produces more power per revolution because it has twice the number of power strokes per rev. However, the Clerk is not twice as powerful as an Otto engine of the same displacement because of its lower efficiency per stroke.

The Otto four-stroke engine is more efficient than the Clerk two-stroke engine and employs a piston/cylinder arrangement wherein the inlet and exhaust ports are located at the top/uppermost portion of the cylinder. The ports include conical, plug-shaped valves that are operated, i.e., opened and closed, by means of a drive cam. The combustible mixture is introduced into the combustion chamber by opening the inlet valve whereby the downward motion of the piston generates a vacuum for drawing the combustible mixture into the cylinder/chamber through the inlet port. In the next stroke, or the compression stroke, the inlet and exhaust valves are closed and the combustible mixture is compressed as the piston traverses upwardly. At or near the top of the piston stroke, Top Dead Center (TDC), the air-gas mixture is ignited to expand the gaseous mixture and drive the piston downwardly in the chamber. Upon completion of the downward or power stroke, the exhaust valve is opened such that the subsequent upward stroke of the piston expels the combusted gases outwardly through the exhaust port into an exhaust manifold. The Otto four-stroke cycle produces a power stroke for every four-strokes of the piston, or once every two revolutions of the drive shaft.

More recent innovations include the Wankel Rotary engine which employ the eccentric motion of a polygonal-shaped rotor within a substantially elliptically-shaped, or more accurately, a epitrochoidally-shaped housing or chamber. The point or apex of the polygonal shaped rotor creates discrete chambers that, (i) accept an air-gas mixture, (ii) expand the air-gas mixture to drive the rotor about an axis and (iii) expel the exhaust gases as the rotor passes an exhaust port. More specifically, as the rotor passes the inlet port, the combustible mixture is introduced within one of the chambers. As this chamber rotates approximately 90 degrees, the mixture is compressed against a wall of the epitrochoidally-shaped housing. Ignition plugs are located at this angular position and, upon ignition, the combustible mixture expands causing the rotor to be driven approximately 120 degrees within the housing. An exhaust port is located at the next rotational position and the combusted gases are expelled from the chamber. Similar to the compression stage of the Wankel cycle, the chamber is reduced in volume, i.e., against the wall of the epitrochoidally-shaped housing to expel the exhaust gases outwardly.

In conventional turbine engines, a compressor section is used to compress air into a combustion chamber. Fuel is introduced into the chamber and ignited to expand the air-gas mixture. Turbine vanes capture the energy of the expanded air-gases to drive a turbine shaft which also drives the compressor section to continue the combustion cycle. Generally, this form of internal combustion engine employs the Brayton air-standard cycle. From its brief description, it will be appreciated that the turbine engine is, perhaps, the most elegant, however, it too has disadvantages which limit its application.

Advantages/Disadvantages & Practical Applications of Reciprocating Piston ICEs

The following is a brief examination of reciprocating piston ICEs in terms of their properties, performance, and practical applications. Inasmuch as the Wankel rotary and turbine engines are not widely employed or have specific/limited applications, these will only be mentioned in terms of their need for gear reduction apparatus to lower output velocities to useable speeds. Furthermore, these engine designs represent a significant departure from the elements and teachings of this invention.

A two-stroke, Clerk cycle, engine delivers a power stroke with each revolution as compared to the four-stroke cycle which delivers a power stroke with every two revolutions. Consequently, reciprocating ICEs employing a two-stroke cycle can, in theory, deliver twice the power of a four-stroke. This theoretical ratio is not realized in practice however because of the lower efficiency of the power stroke in a two-cycle engine. Two-stroke engines do not require valves and the associated mechanisms for the intake of fuel and exhaust of combusted gases. Four-stroke engines, on the other hand, require a complex array of cam-driven valves for intake and exhaust. ICEs employing a two-stroke cycle can operate at any orientation, which can be important in applications wherein the powered-vehicle or device pitches or rolls such as an acrobatic fixed-wing aircraft, helicopter or chainsaw. Engines employing a four-stroke cycle require that oil be delivered from a gravity-based sump. Consequently, four-stroke engines typically are designed with the forces of gravity in mind. Two-stroke engines, therefore, offer simplicity and a significant power-to-weight ratio as compared to many four-stroke engine designs.

Disadvantages of the two-stroke air-standard cycle generally involve wear, fuel efficiency and pollution. The lack of a dedicated lubrication system typically results in a high rate of component wear. Further, two-stroke reciprocating engines, which employ a conventional crankshaft, also experience accelerated wear of the piston. To better understand this phenomenon, it should be appreciated that the eccentricity of the crankshaft causes the piston rod to be oriented off-axis relative to the piston/cylinder axis. As such, a lateral component of the resultant force vector imposes high frictional forces between the piston and cylinder. Consequently, the piston rings wear, pressure is reduced i.e., causing blow-by, and fuel efficiency decreased. Other disadvantages are simply due to the way fuel is burned (or not burned) in two-stroke engines. For example, the exhaust phase of the cycle is, at least in part, combined with the fuel intake and compression phase of the cycle. Consequently, exhaust gases are intermixed with a fresh charge of air-gas, hence, the mixture for ignition is non-optimum, i.e., contaminated by exhaust gases from the previous stroke. Similarly, inasmuch as the intake and exhaust occur nearly simultaneously, but along opposite sides of the cylinder, fresh fuel may be exhausted before ever being compressed and ignited. Consequently, two-stroke engines are not highly fuel efficient.

The principle advantage to a four-stroke air-standard cycle (or Otto cycle) relates to fuel efficiency. More specifically, four-stroke engines employ a stroke entirely dedicated to the exhaust of combusted gases, hence, four-stroke engines burn cleaner and more efficiently than two-stroke engines. That is, combusted gases do not intermix with a fresh charge of air-fuel in or during the compression/ignition stroke. Furthermore, four-stroke engines can have independent/dedicated oil and fuel reservoirs, i.e., do not use a gas-oil mixture, hence four-stroke engines experience less wear and are less costly to operate.

The disadvantages of four-stroke engines have been discussed above, i.e., when being compared to a two-stroke engine, however, suffice it to say that four-stroke engines deliver significantly less power output than two-stroke engines of the same displacement.

Diesel two and four-stroke cycles have the same advantages and disadvantages as those discussed above in connection with the Clerk and Otto air-standard cycles. Diesel engines do, however, allow high compression ratios inasmuch as the flash point (i.e., the temperature at which the fuel ignites) of Diesel fuel is substantially higher than conventional gasoline fuel. While this can offer the advantage of high power output, the advantage of Diesel engines relates to the higher specific energy of diesel fuel and the relatively high efficiency with which it burns.

All of the above air-standard cycles and engine designs operate efficiently at relatively high rotational speeds. For example, a gas turbine engine is typically efficient at about ten-thousand (10,000) RPM. Four-stroke automobile engines are efficient within a range of about fifteen hundred to three thousand (1,500 to 3000) RPM. This is also true for the Wankel rotary engine. Typically, such rotational velocities are significantly above useful speeds to, for example, drive automobile tires, helicopter rotors, ship propellers etc. Consequently, all require speed reduction devices, e.g., transmissions, to lower and control the speed of output drive shafts. It will be appreciated that such devices add significant weight, require periodic maintenance, and are costly to fabricate, operate and maintain.

Other disadvantages of ICEs of the prior art relate to the weight distribution of conventional designs and to a lack of balanced torque output. With respect to the former, the center of gravity (C.G.) of prior art ICEs is frequently offset with respect to the output shaft axis. While this does not present difficulties in many applications, in other applications, such as a compound helicopter, it is beneficial to have the engine C.G. coincident with the output drive shaft axis. For example, helicopters typically are designed such that the turbine engines are juxtaposed relative to the helicopter transmission. Despite the output orientation of the turbine engine (which faces forward), a rather elaborate bevel gearing system is employed to ensure that the center of gravity of the turbine engine lies in the same plane (normal to the longitudinal axis of the helicopter). As such, this drive-train configuration is non-optimal in terms of weight and is highly mechanically complex.

With respect to the latter, helicopters typically employ anti-torque devices to counter-act the torque developed in the fuselage as a result of the high torque required to drive the main rotor system. Conventional anti-torque devices employ tail rotors or propulsive thrusters to generate a torque vector, i.e., at a calculated distance from the main rotor driveshaft axis, which is equal and opposite to the engine-generated torque vector. As such these devices, which include tail cone structures, tail drive shafts, tail rotor gearboxes also add unnecessary weight.

The drive trains used in combination with such ICE's typically employ a speed reduction transmission that may employ bevel, helical and conventional spur gears. Such transmissions may employ a planetary gear system having a sun gear, a stationary ring gear surrounding the sun gear and a plurality of planetary pinions disposed between the sun and ring gears. A carrier assembly maintains the relative position of the planetary pinions as the sun gear drives the planetary pinions about the ring gear. In this arrangement, the sun gear is the input while the carrier assembly functions as the output. Alternatively, the carrier assembly may operate as the input to drive the sun gear.

Another prior art drive train system employs a pair of lobed cams driven by plurality of reciprocating pistons. The cams may be driven in the same direction or in opposite directions. Furthermore, the output drive shafts may be coaxial and counter-rotating to counterbalance the torque produced by each of the drive shafts. Ideal applications for such drive trains include rotorcraft such as helicopters, gyrocopters, and unmanned aerial vehicles (UAVs), submersible vehicles, and ducted fan/vectored-thrust, propeller driven boats such as those employed in the Florida Everglades.

An example of such a cam driven transmission is described and illustrated in O'Neill U.S. Pat. No. 7,219,631 entitled "High Torque, Low Velocity, Internal Combustion Engine" which is incorporated in its entirely herein. The cam driven transmission described therein employs a pair of cam plates each having a lobed cam profile driven by a plurality of reciprocating pistons. The pistons are driven radially by a two or four-stroke piston-cylinder and are timed to engage a sloping drive surface of the cam profile with each downward power stroke of the piston. While the lobed cams may be driven in the same rotational direction, one particularly useful operating mode involves counter-rotation of the cams to equilibrate the torque imparted to each of the cams. As such, the torque imparted to each of the counter-rotating drive shafts is balanced resulting in cancellation of the reaction torque normally carried by the engine case.

The ability of the lobed-cam to drive torque in opposite directions facilitates a number of useful applications, however, one difficulty that can arise relates to the inability to ensure counter-rotation of the cam plates. That is, should the start-up or initial rotational position of the cams be such that the pistons are aligned with the top or bottom-dead center position within the cam profile, it may be impossible to initiate rotation of each in opposite directions without some external force or rotary drive input. In the prior art, a timing gear, e.g., a bevel gear, was employed at the periphery of each cam to establish an optimal or, at least favorable, initial position of the piston drive shafts relative to the cam surfaces, i.e., along the power stroke. As such, this requirement prohibits certain operating conditions and, in certain instances, prohibits or inhibits certain applications.

A need, therefore, exists for a lobed-cam transmission which eliminates the requirement for torque drive augmentation of one or both cam plates to ensure counter-rotational torque drive irrespective the initial rotational position of the piston drive shaft relative to the power surface of the respective cam. Other objectives include a power drive train that maximizes energy conversion, eliminates the need for torque augmentation devices, improves performance, enhances reliability, reduces weight and minimizes mechanical complexity.

SUMMARY OF THE INVENTION

Embodiments of the present invention are directed to a torque drive transmission, having at least two counter-rotating cams bearing-mounted within a housing about a rotational axis. The counter-rotating cams are operative to: (i) convert a linear input to a rotary output, and (ii) drive a pair of coaxial drive shafts in opposite directions along the rotational axis. Furthermore, each counter-rotating cam defines a cam profile surface having drive and follower surfaces defining angles $\alpha$ and $\beta$, respectively. The angles $\alpha$ and $\beta$ are unequal to drive each cam and respective output drive shaft in an opposite rotational direction. As such, the cams may be driven in opposite directions irrespective of the initial rotational position of the linear input, i.e., relative to each counter-rotating cam. In some embodiments, the drive system is part of an Internal Combustion Engine where the radial movement of the pistons drive counter rotation of the cams and output shafts. In other embodiments, the drive system is a stand-alone transmission where rotation of a single rotating input drive shaft on one side is converted into counter rotation of a second coaxial output shaft on the output side.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 8a, 8b, and 8c, depict an alternate embodiment of the invention wherein the drive cams rotate in opposite directions and are shown in several operating positions in response to axial displacement of a piston rod;

FIGS. 11, 12 and 13 depict another embodiment of an inventive drive train wherein the drive cams or cam plates have an axisymmetric cam profile to drive a pair of output drive shafts in opposite directions in response to axial displacement of an input piston rod or shaft;

FIGS. 15a-15d depict various rotational positions of the mirrored cam plates as each rotates in opposite directions about a common rotational axis;

DETAILED DESCRIPTION

The present invention relates to a new and useful cam driven Internal Combustion Engine (ICE) that delivers high torque at low rotational velocity. The invention also describes a new and useful drive train operative to drive a pair of drive shafts in opposite directions.

The preferred embodiment is described in the context of eight reciprocating pistons acting on two internal rotating drive cams that, in turn, drive coaxial output shafts. It will be appreciated, however, that the inventive features of the invention may be applied to similar internal combustion engines having fewer or a greater number of reciprocating pistons, to those having more than two cam drives, to those wherein the drive cams rotate in the same or opposite rotational directions, or to those having a single output drive shaft. The present invention also is directed to a torque drive transmission for driving an output relative to a rotating input. The output may be a reciprocating or rotating output which drives in the same or opposite directions relative to the input. In one embodiment discussed in greater detail hereinafter, the rotating output includes a pair of counter-rotating coaxial drive shafts, i.e., driven in the opposite directions.

High Torque, Low Velocity Internal Combustion Engine (ICE)

Figure 1A:
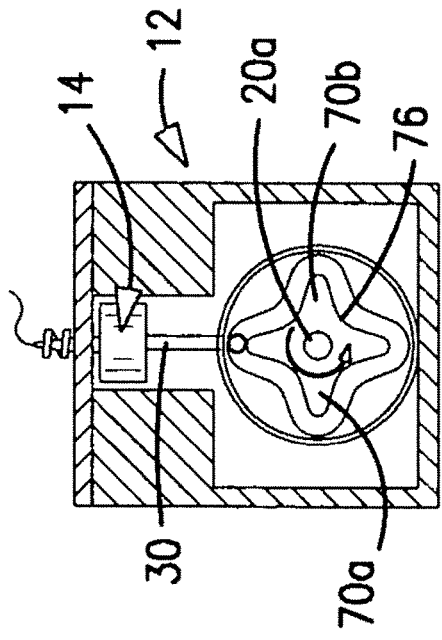
FIGS. 1a, 1b, and 1c depict schematic views of an Internal Combustion Engine (ICE) according to one embodiment of the invention wherein FIG. 1a the output drive shafts of the ICE are driven in the same rotational direction, in FIG. 1b the output drive shafts of the ICE are co-axial and counter-rotate relative to each other, and, in FIG. 1c, output drive shafts of the ICE are driven in the same rotational directions but at different rotational speeds.
Figure 1B:
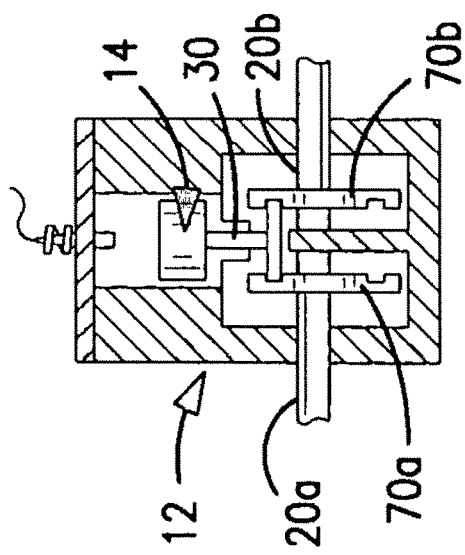
Figure 1C:
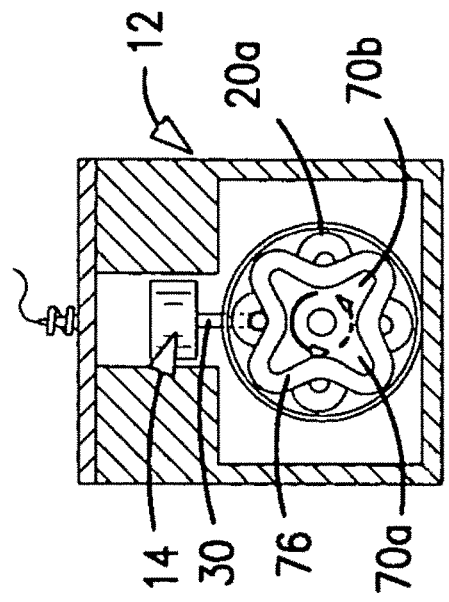

Before discussing the internal details and specific embodiments of the invention, it is useful to obtain a broad overview of the invention by referring to the schematics shown in FIGS. 1a, 1b, 1c. In the broadest sense of the invention, the ICE comprises a housing 12 which supports: a reciprocating piston means 14, i.e., piston/cylinders, first and second drive cams 70a, 70b, and first and second output drive shafts 20a, 20b. The piston means 14 drive a plurality of piston rods 30 radially and linearly within the housing 12. The first and second drive cams 70a, 70b are driven rotationally in response to the linear motion of the piston rods 30.

In FIGS. 1b and 1c, the first and second drive cams 70a, 70b, include a plurality of lobes 76 which are either in-phase (as seen in FIG. 1b) or, out-of-phase (as seen in FIG. 1c). The first and second drive cams 70a, 70b are responsive to the axial motion of the piston rods 30, i.e., acting on the lobes, such that each is rotationally driven. In FIG. 1b, the in-phase lobes cause the drive cams to be driven in the same rotational direction, while in FIG. 1c, the out-of-phase lobes 76 cause the drive cams 70a, 70b to be driven in opposite rotational direction. As such, the output drive shafts 20a, 20b, which are rotationally coupled to the drive cams 70a, 70b, may drive in the same or opposite rotational direction. When the drive shafts 20a, 20b, drive in opposite rotational directions, a torque-balanced output is achieved.

Figure 2:
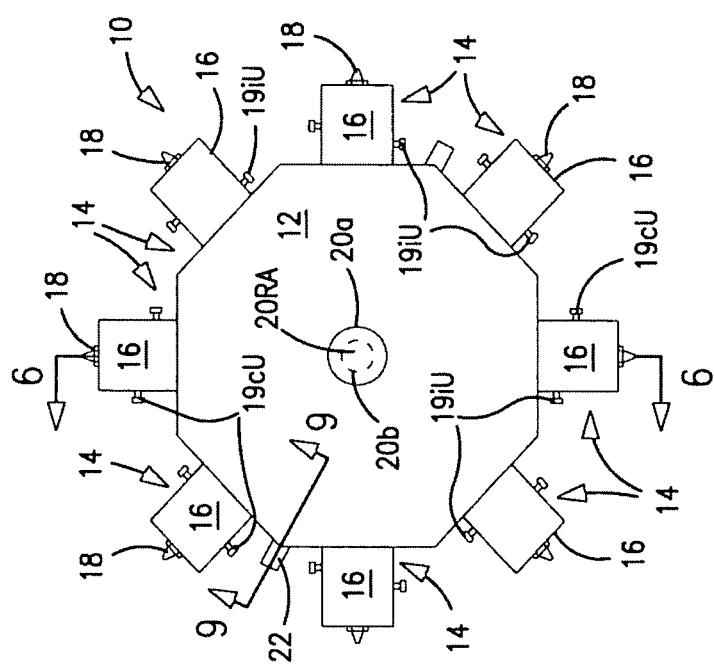
FIG. 2 depicts a front view of the ICE according to the present invention.

The following drawings illustrate an exemplary embodiment of an Internal Combustion Engine (ICE) according to the present invention. More specifically, and referring to FIGS. 2 and 3, the ICE 10 according to the present invention includes a central housing 12 having a plurality of radially oriented reciprocating piston/cylinders 14 disposed about the periphery of the housing 12. While the piston/cylinders 14 are depicted as being separate elements mounted to the central housing 12, one will appreciate that the outer housings 16 of each piston/cylinder may be integral with the central housing 12, i.e., the bore of each piston (not shown in FIGS. 2 and 3) may be machined integrally therein. Consequently, the housing 12 generically refers to any structure which functions to support internal working components, therefore, includes items such as the outer cylinder housing 16.

Figure 3:
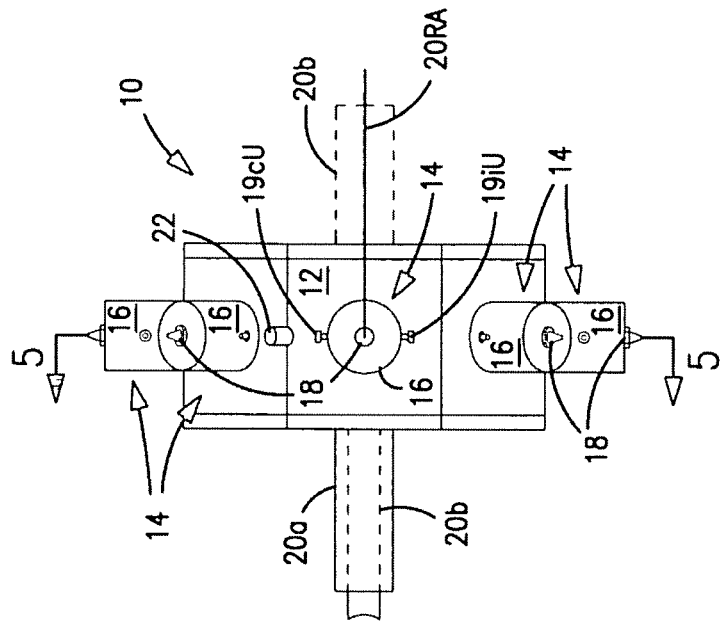
FIG. 3 depicts a side view of the ICE according to the present invention.

Each of the piston/cylinders 14 includes an ignition device, e.g., a spark plug 18, and employs a Carnot two-stroke air-standard combustion cycle, hence, the intake and exhaust ports, 19iu, 19eu, respectively, are located at an appropriate position relative to the internal reciprocating piston (not shown}. In the preferred embodiment, the ICE 10 drives output drive shafts 20a, 20b and, may also drive one or more auxiliary output shafts 22 orthogonal to the axes 20RA of the output drive shafts 20a, 20b. The output drive shafts 20a, 20b, may be co-axial, concentric and disposed through a single side of the housing 12 as shown or may be co-axial, but extend outwardly from oppositely disposed sides of the housing 12. That is, each of the output shafts 20a, 20b, being 180 degrees from the other of the shafts 20a, 20b. FIG. 3 shows the second output shaft 20b in dashed lines to illustrate this embodiment of the invention.

Figure 4A:
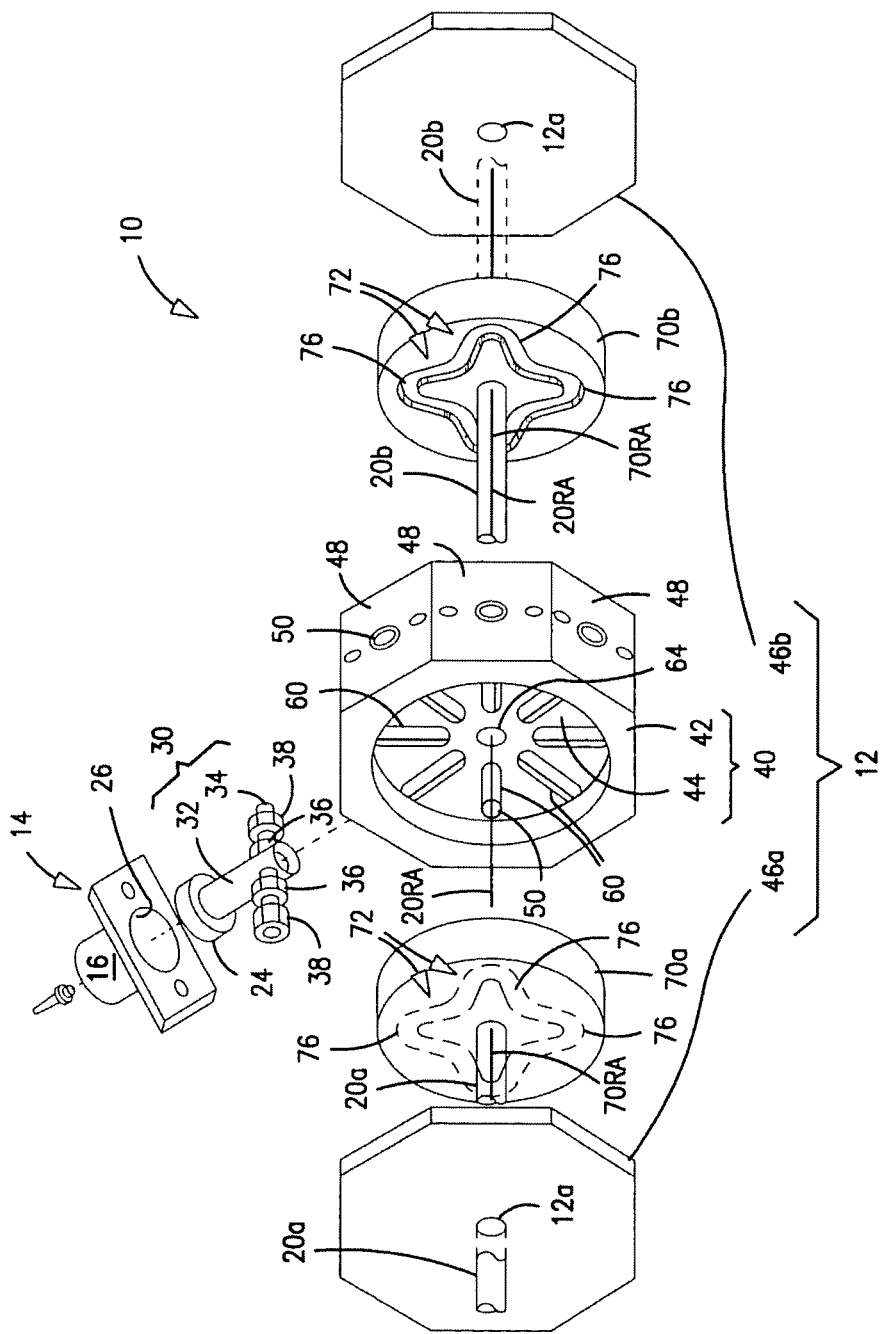
FIG. 4a depicts an exploded view of the ICE of the present invention including a housing, piston/cylinders disposed about the periphery of the housing, piston shafts, a pair of drive cams having lobed raceways, and output drive shafts.

In FIG. 4a, an exploded view of the ICE 10 is shown to reveal the principal internal components. Certain well-known elements such as gaskets, seals, shaft bearings etc., have been omitted to enhance the clarity of illustration. As briefly discussed in the schematic drawing, the principle internal components of the ICE 10 include, the reciprocating pistons 24, piston rods 30, a central body portion 40 of the housing 12, and drive cams 70a, 70b. The structure, function and interaction of each are described below.

Each piston 24 reciprocates within a central bore 26 of the piston/cylinder housing 16 and drives a piston rod 30 having a generally inverted-T configuration. That is, each piston rod 30 comprises a central shaft 32 and a cross member 34 which is substantially perpendicular to the central shaft 32. The central shaft 32 is rigidly or articulately mounted to the underside of the piston 24 and is substantially radial relative to the axes 20RA of the output drive shafts 20a, 20b. The benefits of such orientation will be described in greater detail below, however, the orientation of the piston rod 30 will generally impact the torque output of the ICE 10. Disposed over the cross member 34 is an innermost or first rolling element bearing 36 and an outermost or second rolling element bearing 38, the function of each being described in greater detail hereinafter.

The central housing 12 includes a center body portion 40 having a generally octagonal-shaped peripheral rim 42 and a central web 44 formed internally of and integrally with the peripheral rim 42. End plates 46a, 46b, having the same octagonal shape of the peripheral rim 42, close each end of the center body portion 40 to define internal chambers or cavities between the central web 44 and each end plate 46a and 46b. Moreover, a central aperture 120 is formed in at least one of the end plates 46a, 46b to accept the output drive shafts 20a, 20b.

The end plates 46a, 46b of the central housing 12 may be affixed to the center body portion 40 by any of a variety of means. In the preferred embodiment, the end plates 46a, 46b are fastened by a plurality of through-bolts (not shown) to the peripheral rim 42 of the center body portion 40.

While the central housing 12 is shown to have a generally octagonal external appearance, such configuration facilitates the mounting of each piston/cylinder housing 16 to the central housing 12, i.e., along planar surfaces 48 thereof. As mentioned previously, each piston/cylinder 14 may be integrally formed or machined within the central housing 12 or may vary in number, and, consequently, the external configuration thereof may take on a variety of shapes including cylindrical, hexagonal, decagonal, or other polygonal configurations.

The center body portion 40 further includes radially oriented apertures 50 and slots 60 for accepting each piston rod 30. More specifically, the apertures 50 extend through the peripheral rim 42 and central web 44 in a substantially radial direction, i.e., toward the drive shaft axes 20RA, and accept the central shaft 32 of each piston rod 30. The slots 60 extend through the web 44 in a lateral direction and accept the cross members 34 of each piston rod 30. Moreover, the innermost bearings 36 are interposed between the cross members 34 and each slot 60. Finally, in the preferred embodiment, the central web 44 includes an output aperture 64 aligned with a central aperture 12o of the housing for accepting at least one of the output drive shafts 20a, 20b.

Figure 4C:
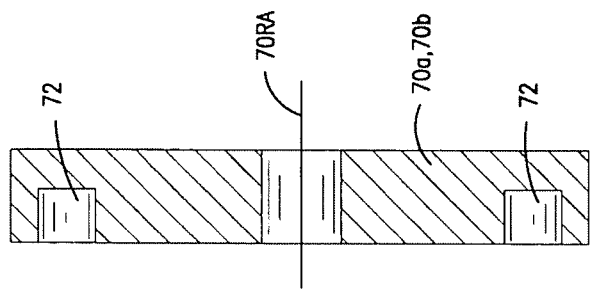
FIG. 4c depicts a cross-sectional view taken along line 4c-4c of FIG. 4b.
Figure 4B:
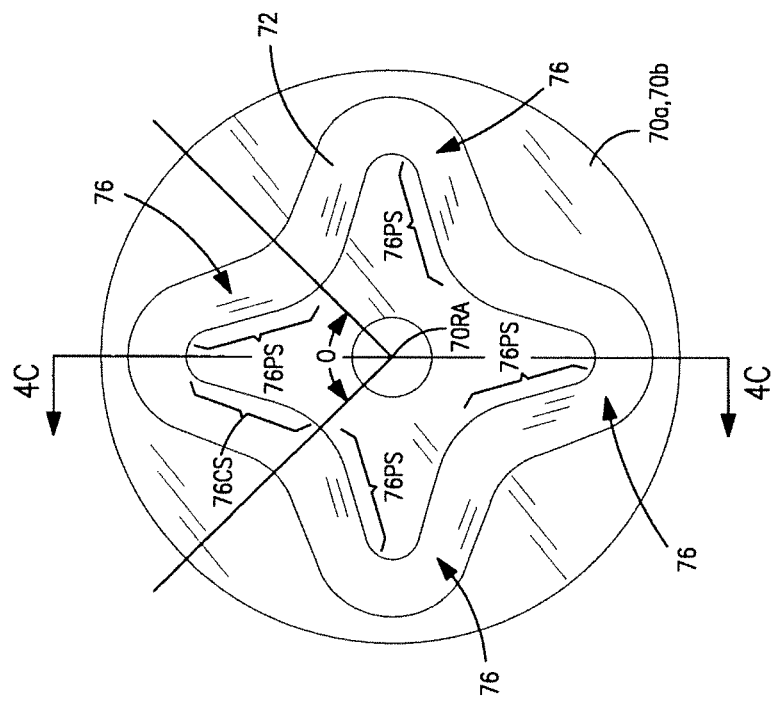
FIG. 4b depicts an isolated front view of a drive cam according to the present invention.

Within the central housing 12 are first and second drive cams 70a, 70b each having a generally disc-shaped configuration and an axis of rotation 70RA. More specifically, and referring to FIGS. 4a-4c, each of the drive cams 70a, 70b includes a continuous raceway or cam path 72 circumscribing its rotational axis 70RA and having a repeating sinusoidal pattern or configuration (only one drive cam 70a is depicted in FIGS. 4b, 4c inasmuch as, in this embodiment of the invention, the drive cams 70a, 70b are essentially identical). In the preferred description, each raceway 72 defines approximately four (4) selectively shaped "lobes" 76 (see FIG. 4b). Each lobe 76, furthermore, defines power and compression stroke surfaces 76PS and 76CS, respectively. While the preferred embodiment depicts a selectively shaped lobe 76, the invention anticipates other variations of a wave pattern and is not limited to this specific shape or curvilinear raceway.

Furthermore, the drive cams 70a, 70b are paired such that the raceway 72a of a first drive cam 70a faces the raceway 72b of a second drive cam 70b. In a first embodiment of the invention each of the raceways 72 is symmetric and the drive cams 70a, 70b, co-rotate about rotational axis 70RA in the same or in opposite directions. In a second embodiment, discussed in greater detail below, the raceways 72a, 72b are "asymmetric" and the drive cams 70a, 70b, are forced to counter-rotate relative to each other. In yet another embodiment, the number of lobes may vary, (i.e., multiples of each other) and the drive cams may operate at different rotational speeds, either in the same or opposite directions.

Referring again to FIG. 4a, each of the drive cams 70a, 70b are rotationally coupled to and drive one of the output drive shafts 20a, 20b. In the preferred embodiment, the drive cams 70a, 70b are press-fit to the output drive shafts 20a, 20b, however, other connecting means such as splines, teeth, or keyways may be employed. The drive shafts 20a, 20b may be coupled to drive in the same rotational direction or co-axial (one shaft 20b within the other shaft 20a) to drive in opposite rotational directions.

Figure 6:
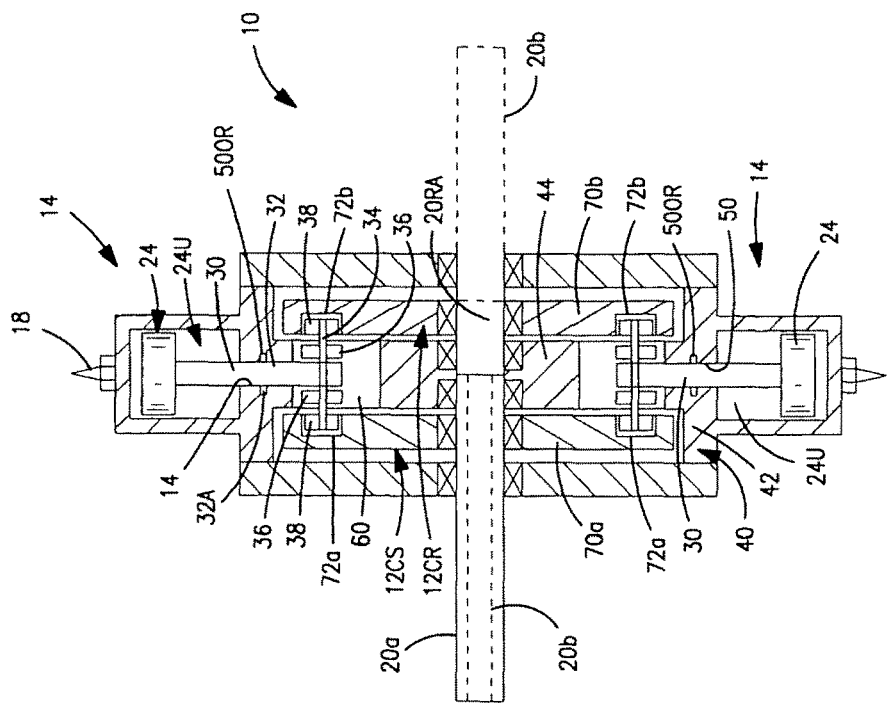
FIG. 6 depicts a cross-sectional view taken substantially along line 6-6 of FIG. 2.
Figure 5:
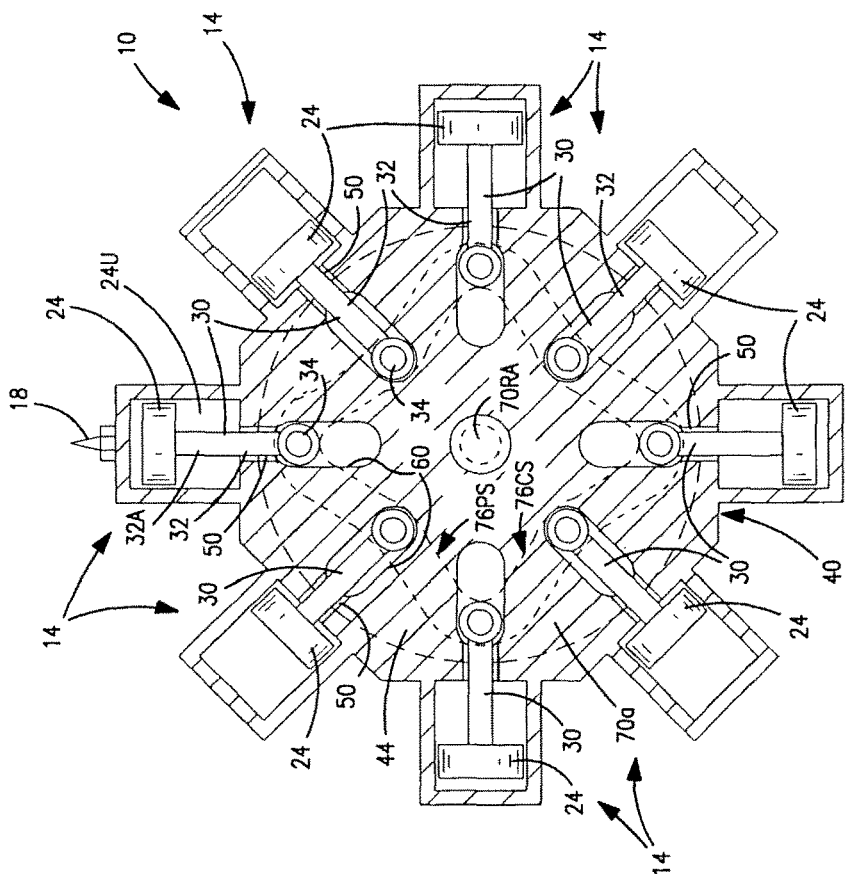
FIG. 5 depicts a cross-sectional view taken substantially along line 5-5 of FIG. 3.

A better understanding of the operation of the inventive ICE 10 may be had by examination of FIGS. 5 and 6. Referring to FIG. 5, the pistons 24 of each piston/cylinder 14 reciprocate axially to effect linear motion of the respective piston rods 30. In the preferred embodiment, a Carnot two-stroke air-standard cycle is employed to produce maximum power (for each piston stroke) and to eliminate the need for complex valving. The axis 32A of each central shaft 32 is oriented in a substantial radial direction relative to the rotational axes 20RA of the output drive shafts 20a, 20b.

Inasmuch as the motion of piston rod shaft 32 is linear, it is desirable to seal the central shaft 32 relative to its respective piston aperture 50, e.g., via a conventional seal 50OR (seen only in FIG. 6). As such, the scavenging pressure in the lower portion or chamber of the piston cylinder 24u may be substantially increased to boost the pressure within the piston/cylinder 14, i.e., as the air-gas mixture is injected into the piston/cylinder 14. In an alternate embodiment of the invention, discussed in greater detail hereinafter, a secondary ignition device may be introduced on the underside 24u of the piston 24, thereby generating a power stroke with each stroke of the reciprocating piston 24.

The cross member 34 of each piston rod 30 engages the radial slot 60 of the central web 44 and each of the drive cams 70a, 70b (see FIG. 6). Specifically, the innermost bearings 36 ride along and engage the radial slot 60 and the outermost bearings 38 engage and ride within the raceways 72a, 72b of the first and second drive cams 70a, 70b. In operation, the axial displacement of the piston rod 30 causes the cross members 34 to act on the inclined power and compression surfaces 76PS, 76CS (shown in phantom lines in FIG. 5) of the lobed raceways 72a, 72b, to effect rotational motion of the drive cams 70a, 70b. More specifically, a downward stroke of the piston rod 30 on the power stroke surface 76PS of the lobe 76 generates a tangential load on the drive cams 70a, 70b, thereby driving the cams, and consequently, the output drive shafts 20a, 20b. The inertia of the drive cams 70a, 70b, in conjunction with the inertia of the output drive shafts 20a, 20b, causes the compression stroke surfaces 76CS to drive the piston rod 30 upward, thereby compressing the air-fuel mixture within the piston cylinders 14.

As a consequence of the linear-to-rotary translation, it will be appreciated that high loads are developed in the cross members 34. The ICE 10 of the present invention employs an efficient torque reaction means defined by the interaction between the radial slots 60 in the central web 44 and the innermost rolling element bearings 36. More specifically, the radial slots 60 are particularly rigid, i.e., structurally efficient, within the housing 12 due to the structural continuity of the central web 44, i.e., the central web 44 is a unity structure extending diametrically across the center body portion 40, i.e., the peripheral rim 44, of the housing 12. As such, in this embodiment of the invention, the central web 44 defines two discrete housing chambers 12C1 and 12C2 (see FIG. 6) Moreover, the ICE 10 employs rolling element bearings, in contrast to various sliding element bearings occasionally seen in the prior art, to react the load along a "point", and between each drive cam 70*a* or 70*b* and the piston rod shaft 32.

Referring again to FIG. 4*b*, the drive cams 70*a*, 70*b* rotate though an angle equal to the arc length of one lobe 76 with each cycle of a reciprocating piston. In the described embodiment, a drive cam having four lobes will rotate through an angle θ of about 90 degrees with every piston cycle (i.e., two-strokes). It will, therefore, be appreciated that the ICE 10 of the present invention avails the designer nearly limitless options with respect to determining an engine speed (i.e., of the output drive shafts) by defining the number of lobes to be employed. For example, since two cycle reciprocating piston/cylinders operate very efficiently at about 1500 to 2000 cycles (or 3000 to 4000 strokes) per minute, drive cams 70*a*, 70*b* having four lobes will rotate at about 400 to 500 revolutions per minute. Alternately, drive cams having 10 lobes will rotate at about 150 to 200 revolutions per minute.

In the preferred embodiment, the firing pattern of the piston/cylinders comprises the ignition and downward stroke of four (4) pistons simultaneously, each acting on a power stroke surface 76PS of one lobe 76. In an ICE having eight piston/cylinders, alternating pistons/cylinders are fired first, and the remaining piston/cylinders are subsequently fired. Consequently, within each 45 degrees of drive cam rotation, a power stroke is initiated. When employing an odd number of lobes and an even number of P/Cs, the firing pattern may be even smoother. That is, a firing pattern may be based upon a calculation that divides a full rotation (i.e., 360 degrees) by the quotient of the number of P/Cs with the number of drive cam lobes. For example, an ICE 10 having eight (8) P/Cs and three (3) drive cam lobes yields a quotient of twenty-four (24). A full rotation of 360 degrees divided by 24 suggests that an ICE so configured can employ a firing pattern having a power stroke with every 15 degrees of drive cam rotation. Thus, a smoother, i.e., low vibration ICE may result.

Figure 7:
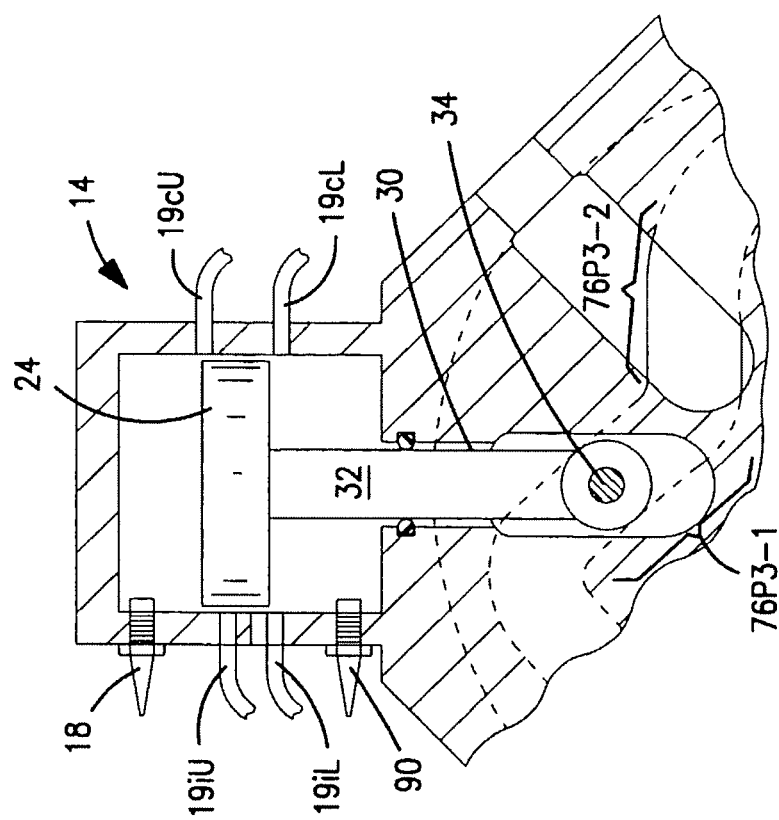
FIG. 7 depicts an alternate embodiment of the invention wherein a second ignition device is disposed in the lower portion or chamber of the piston/cylinder to augment the power output of the piston/cylinder.

As previously mentioned, the linear motion of the piston rods 30 provides an opportunity to seal the central shaft portions 32 thereof to the respective 50 thereby increasing the scavenging pressure in a conventional two-stroke piston cylinder. Furthermore, in yet another embodiment of the invention shown in FIG. 7, a second ignition device 90 may be employed in each cylinder 14 and on opposing sides of the piston 24 to develop a power stroke with each stroke of the piston 24. In this embodiment, fuel is injected and expelled through intake and exhaust ports 19*i*L, 19*e*L, respectively, disposed in the lower portion of the cylinder as a function of the position of the piston 24 within the cylinder 14 (functioning as a valve). Furthermore, the cross member 34 of each piston rod 30 acts on opposing first and second power stroke surfaces 76PS-1 76PS-2, such that the central shaft 32 of the piston rod 30 is in compression upon a downward stroke of the piston 24 and in tension (acting on the uppermost raceway surface 76PS-2) upon an upward stroke of the piston 24.

The simplified construction and configuration of the ICE 10 of the present invention facilitates fabrication via a variety of low-cost manufacturing approaches. Reference is made collectively to FIGS. 4*a* through 7. Preferably, the center body portion 40 of the housing 12, and the drive cams 70 are high-speed machined using Numerically Controlled (NC) cutting apparatus. For example, a block of steel or aluminum in the general shape of the center body, e.g., a solid cylinder, octagon, etc. formed by forging, machining, casting or other known method. Initially this block is about six (6") inches in thickness. Piston rod apertures 50 are then drilled radially inwardly from the periphery of the cylindrical block. The longitudinal depth of the apertures 50 include the combined length of the central shaft 32 of the piston rod 30 (from the plane defined by the underside of the piston to the tip end including the thickness of the cross member 34) and the length of the slot 60 (e.g., minimally the length of piston stroke). Further, if timing gears are desired, one or more additional apertures are also drilled.

Next, the block is laid flat to high speed machine each side of the central web 44. In this step, material is cut away to a depth of about two inches thereby creating each cam chamber or cavity (12*c*1 and 12*c*2) and leaving a web thickness of about two (2") inches. Minimally, the thickness of the central web 44 will be about one and one-half to two times (1½×) the diameter of the central shaft 32 of the piston rod 30. Again, if a timing gear 80 is anticipated, a cut-out is machined in the web 44 to accept the gear 80. The radial slots 60 are then machined through the central web 44 intersecting with each piston rod aperture 50. The width of the slot 60 will be larger than the diameter of the piston rod apertures 50 and slightly greater than the diameter of the innermost needle or roller bearing 36. In the preferred embodiment, the diameter of the bearing 36 is about one and three-eights inches (⅜") and the width of the radial slot 60 is about one and seven-sixteenths inches (1 7/16"). As alluded to above, the slot length will be minimally equal to the stroke of the piston rod 30, which in the preferred embodiment is about two inches (2"). A central aperture 64 is also drilled to accept the coaxial output drive shafts 20*a*, 20*b*. Next, the external surfaces of the peripheral rim 42 is ground to accept each piston/cylinder housing 16 and end plates 24*a*. 24*b*.

Upon completion of the initial rough-machining operations, the bearing surfaces 60*s* of the slots 60 and the piston rod aperture surfaces 50*s* may be hardened to provide greater wear resistance. Accordingly, the bearing surfaces 50*s*, 60*s* may be masked and the entire center body 40 placed in a copper bath to electrolytically deposit copper on all exposed surfaces. Next, the masking material is removed from the bearing surfaces 50*s*, 60*s* and the center body 40 is treated in a carborization vessel. Therein, carbon penetrates and permeates all bearing surfaces without penetrating areas which are copper-coated. Finally, the bearing surfaces 50*s*, 60*s* and the peripheral rim 42 are precision ground to final dimensions.

The drive cams 70*a*, 70*b* are fabricated in a similar manner. Plates having a cylindrical or disc-like configuration are routed to form the lobed cam raceways 72. Each of the drive cams 70*a*, 70*b* are approximately one and one-half inches (1½") in thickness. Furthermore, the height of the cam raceways 72 are slightly greater than the diameter of the outermost needle or ball bearing 38 approximately or about one and seven-sixteenths inches (1 7/16"), and the depth of the cam raceways 72 are about one and one-quarter inches (⅝").

Similar to the center body housing, it may be desirable to surface harden the cam raceways 72. The same masking and carborizing steps may be followed as described above.

The present invention is useful in any engine application wherein high torque is required in combination with low rotational speed. For example, tug-boat engines must generate enormously high torque while turning a thrusting propeller at very low RPM. Similarly, rotorcraft turbine engines must generate high torque while turning the lifting rotor at about 300 revolutions per minute. The ICE 10 of the present invention is applicable to both such applications, and many more, while at the same time, eliminating the cost, maintenance and weight of intermediate speed reduction devices. That is, by first determining/designing the number of drive cam lobes 76, the ICE 10 of the present invention may be configured to produce a rotational speed that is appropriate for the high torque, low speed application.

Should slight speed deviations be sought or desired, the speed of the reciprocating pistons 24 may be increased or decreased to vary the speed of the drive cams 70*a*, 70*b*, and output drive shafts 20*a*, 20*b*. For example, it is common for a helicopter rotor to be controllable within a range of between within 93% NR to about 107% NR. The ICE of the present invention could be readily adaptable to this application thereby eliminating the need for input modules, main gearbox modules, and multi-stage, speed-reducing epicyclical gearing. As such, hundreds of pounds of intermediate gearing/transmissions could be eliminated.

Thus far, the ICE of the present invention has made little or no distinction between drive cams 70*a*, 70*b*, which are symmetric or asymmetric. In general, all of the above teaching can be employed for either drive cam orientation or rotational direction. Referring now to FIGS. 8*a*, 8*b* and 8*c*, an important and particularly useful embodiment of the ICE is depicted wherein the drive cams 70*a*, 70*b* are shown rotating in opposite directions with respect to one another (drive cam 70*a* is shown in solid lines while drive cam 70*b* is shown in dashed lines). That is, the lobes 76 of the first drive cam 70*a*, are angularly advanced with respect to second drive cam 70*b*. Referring to FIG. 8*a*, the cross member 34 of each piston rod 30 engages the lobes 76 is a "scissors-like" pattern, wherein during a downward power stroke, the cross member 34 splits the lobes, as if pushing down the cutting edges of a scissors (causing the scissors to open). FIG. 8*b* shows a second angular position wherein the drive cams are rotating in opposite rotational directions as indicated by arrows FT. Yet a third angular position is shown in FIG. 8*c*, wherein the drive cams 70*a*. 70*b* and respective lobes 76 essentially overlap, yet are ninety (90) degrees out-of-phase.

During an upward compression stroke the lobes 76 come together, i.e., pushing the cross member upward, like the cutting blades of a scissors. One can simply envision the reverse of the positions depicted in FIGS. 8*a*-8*c*. That is, examining FIGS. 8*a*-8*c* in reverse order, or from FIG. 8*c*, to FIG. 8*b* and finally to FIG. 8*a*. Consequently, when positioning the lobes in an out-of-phase orientation, the drive cams 70*a*, 70*b* counter-rotate at the same rotational speed, i.e., assuming that each drive cam 70*a* or 70*b* contains the same number of lobes 76. Furthermore, the output drive shafts 20*a*, 20*b*, counter-rotate to torque-balance the power output.

In yet another embodiment (not illustrated), the number of lobes 76 on one of the drive cams 70*a*, 70*b*, is a multiple number or integer relative to the number of lobes 76 on the other of the drive cams 70*a*, 70*b*. For example, if the number of lobes 76 of the first drive cam 70*a* is two (2) then the number of lobes on the second drive cam 70*b*, is a multiple of two (2), hence is four (4), eight (8), etc. As such, the second drive cam 70*b* rotates at one-half the rotational speed as the first drive cam 70*a*. Moreover, this variation in lobe number applies to both earlier embodiments wherein the drive cam lobes 70*a*, 70*b* rotate in the same or opposite directions. This embodiment is useful wherein different output speeds are desired.

Figure 9:
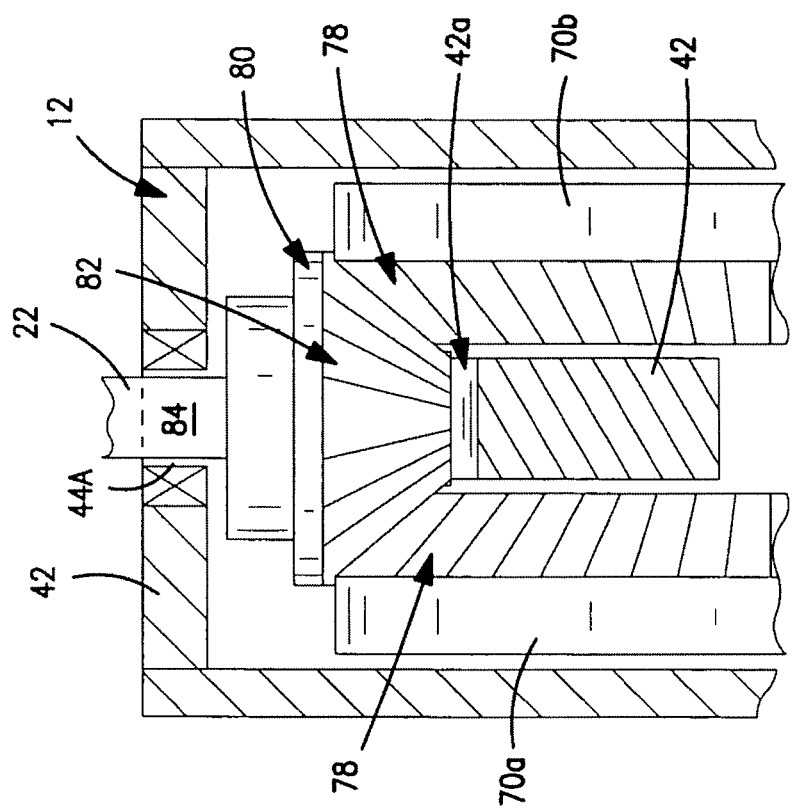
FIG. 9 is a partially broken away, cross sectional view taken substantially along line 9-9 of FIG. 2 depicting an alternate embodiment of the present invention wherein one or both of the drive cams include peripheral gear teeth which engage a bevel or pinion gear to establish and fix the relative angular alignment of the drive cams, to provide another output for driving auxiliary equipment, and/or for load sharing.

In FIG. 9, an alternate embodiment of the present invention is shown wherein each of the drive cams 70*a*, 70*b* include peripheral gear teeth 78 which jointly engage a timing gear 80 to establish and fix the relative angular alignment of the drive cams 70*a*, 70*b*. That is, the housing 12 may be adapted to include a means for rotationally supporting the timing gear 80 along the underside of the peripheral rim 42. The timing gear includes bevel or spur gear teeth 82 for intermeshing with bevel or face gear teeth 78 of each drive cam 70*a*, 70*b*. In the preferred embodiment, an opening 44*o* is formed in the central web 44 adjacent the underside of the peripheral rim 42 and a radial aperture 44A is formed in the rim 42 to accept a radial shaft 84. The radial shaft 84 extends into the opening 44*o* and functions to rotationally support the timing gear 80 which rotates about the shaft 84. As such, the timing gear 80 functions to ensure that the drive cams 70*a*, 70*b* maintain their desired angular offset or rotational orientation, while furthermore, serving to effect load sharing between the cams 70*a*, 70*b*. That is, whenever a singular input (such as, in the present invention, a piston rod 30), effects the transfer of load into two rotating output devices (such as the drive cams 70*a*, 70*b* of the present invention), load sharing must be considered to ensure that all of the load is not transferred to only one output device. Consequently, the timing gear 80 also functions as a means for effecting load sharing by causing an overload condition in one of the rotating drive cams 70*a*, 70*b* to be transferred to the other of the drive cams 70*a*, 70*b*.

Furthermore, the radial shaft 84 may extend through the peripheral rim 42 to function as a timed shaft for driving auxiliary equipment. That is, the radial shaft 84 may dually serve as the auxiliary drive shaft 22 for driving such equipment as alternators, generators, oil pumps, oil coolers, etc. For instances wherein synchronous timing or load sharing are not desired, the timing gear 80 may function solely to drive an auxiliary output drive shaft. Furthermore, while the timing gear 80 is shown as dually functioning to synchronize and provide an auxiliary drive, the timing gear 80 need not engage both drive cams 70*a*, 70*b*, nor is the use thereof limited to applications having counter-rotating drive cams 70*a*, 70*b*.

For example, the timing gear 80 may be driven by only one of the drive cams having peripheral gear teeth (this and subsequent configurations are not shown). Furthermore, the timing gear may be disposed to either side of one or both drive cams 70*a*, 70*b*. Finally, one or more timing gears may be employed and may intermesh with adjacent gears of the same or varying diameter dimensions to increase or decrease the rotational speed of the auxiliary shafts.

The counter-rotating, co-axial output shaft configuration of the present invention is particularly useful in applications wherein torque is sufficiently high so as to unintentionally or adversely affect the body or structure to which the ICE is affixed to or attached. To demonstrate this need, one could envision a drag racing automobile wherein the engine torque is sufficiently high to lift the front wheels of the automobile. Consequently, automobile designers resort to lengthening the nose or front end of the vehicle to develop a downward, gravity-induced moment. Other, more common examples include the conventional compound helicopter or rotorcraft. In helicopter applications, torque loads are sufficiently high on the aircraft fuselage to require that other devices be employed to counteract the torque of the main rotor shaft. Typically, a tail rotor is employed to provide a yaw component of thrust to counteract the torque developed at the main bull gear where torque is input to the main rotor shaft. It will be appreciated, therefore, that the torque balanced-output of an ICE 10 according to the present invention could eliminate the need for a tail rotor, and the hundreds of pounds of weight associated with the tail drive shafts, tail rotor gearbox, and tail cone.

Yet other examples include heavy farm equipment wherein elongate arms or other stabilizing structure are occasionally used to "steady" the vehicle. Here again, high torque is developed in the engine, which causes the entire vehicle to rotate. Use of the ICE 10 of the present invention could eliminate the need for such stabilizing structure by providing torque-balanced output.

Figure 10:
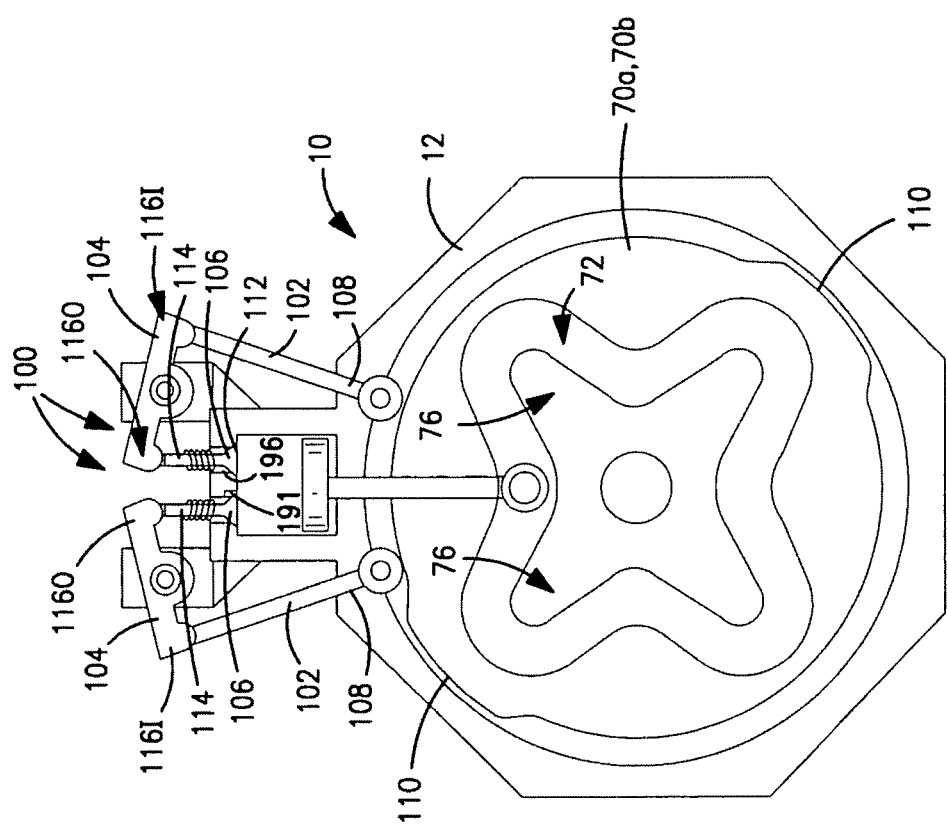
FIG. 10 depicts schematic view of another embodiment of the ICE wherein the drive cams and piston/cylinder have been modified to accommodate a four-stroke air-standard cycle.

Should four-stroke fuel efficiency be desired, the ICE of the present invention may be readily adapted to accommodate this air-standard cycle. FIG. 10 shows a schematic of an exemplary embodiment of the ICE 10 adapted for a four-stroke cycle. Therein, the ICE 10 includes valve means 100 responsive and timed relative to the rotational displacement of the drive cams 70a, 70b. More specifically, the valve means includes spring-loaded plungers 102, rocker arms 104 and conventional stem valves 106. Each spring-loaded plunger 102 is disposed within a bore 108 of the housing 12 and contacts peripheral cam surfaces 110 formed about the periphery of one or both drive cams 70a, 70b. In the preferred description, a first spring bias means is employed to maintain the plungers in contact with the peripheral cam surfaces 110 as the cams 70a, 70b rotate.

The intake and exhaust stem valves 106 are conventional and include a seat portion 112 and a stem portion 114. The seat portion 112 is disposed internally of the cylinder and in register with a respective port 19i or 19e, while the stem portion 114 connects to the seat portion 112 and extends through its respective port 19i or 19e. The valves 106 are, furthermore, repositionable from an open position to a closed position, wherein the seat portion 112 thereof seats against the periphery of a respective port 19i or 19e in a closed position to provide a seal for preventing the flow of gases therethrough and permitting the flow of gases when in an open position. In the preferred description, a second spring bias means is employed to bias the valves 106 in an open or closed position while, furthermore, acting to support and center the valves 106 relative to its respective port.

The rocker arms 104 are disposed between and connect each spring-loaded plunger 102 to a respective each of the valves 106. More specifically, the rocker arms 104 each have an input and output end 116I and 116O, respectively, and mount to the housing 12 about a pivot point 118. Furthermore, each input end 116I pivotally mounts to one of the plungers 102 and each output end 116O pivotally mounts to one of the valves 106.

In operation, rotation of the drive cams 70a, 70b within the housing 12 causes the peripheral cam surfaces 110 to displace the plungers 102, thereby pivoting the rocker arms 104 and opening and closing the valves 106 as a function of the angular position of the drive cams 70a, 70b.

Embodiments wherein the drive cams 70a, 70b rotate in opposite directions will require that each of the drive cams 70a, 70b include such cam surfaces. While the cam surfaces 110 are shown to project radially outward, it will be appreciated that any change in radial dimension, inwardly or outwardly will serve the intended purpose of the peripheral cam surfaces 110 (described in greater detail in the subsequent paragraphs). In the described embodiment there are at least two (2) such peripheral cam surfaces 110 equiangularly-spaced about the circumference of the drive cam 70a thereby opening and closing the valves 106 in a four-stroke air-standard cycle.

Asymmetric Drive Cam for High Torque, Counter-Rotating Transmission

While the foregoing was directed to a new and Internal Combustion Engine (ICE) having a plurality of reciprocating pistons for engaging a cam drive transmission assembly, the following is directed to a new and useful lobed cam transmission operative to balance the high torque output produced by one or more linear/radial power sources such as one or more reciprocating piston engines. More specifically, the lobed cam transmission receives a linear radial input from at least one of the reciprocating pistons and delivers a rotating output to a drive shaft, one of the output shafts rotating in an opposite direction to another output shaft. More specifically, the coaxial counter-rotating output shafts are driven by a pair of lobed cams each having a novel cam profile which ensures counter-rotation irrespective the position of the radial input shaft.

Figure 14:
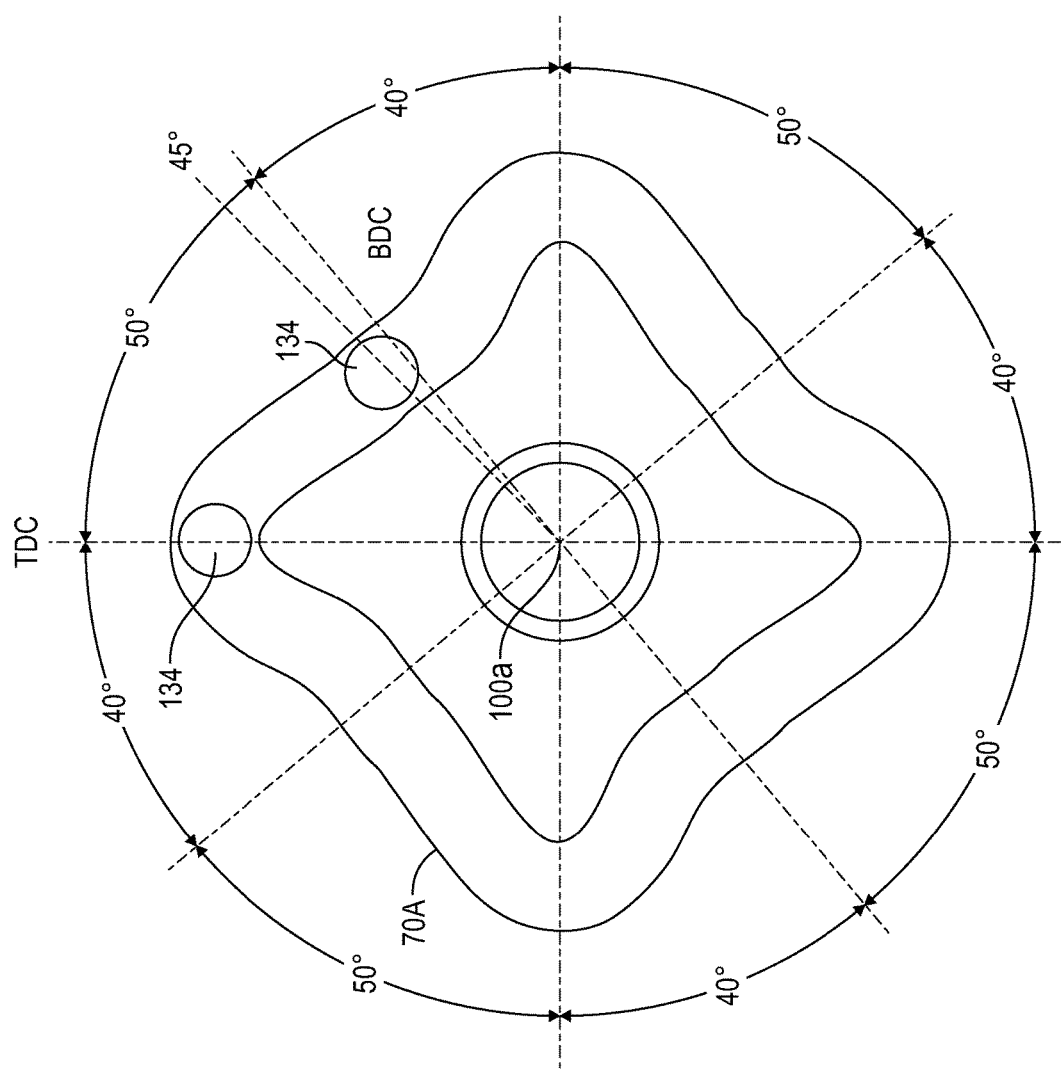
FIG. 14 is a plan view of an exemplary 4 lobe drive cam.
Figure 14A:
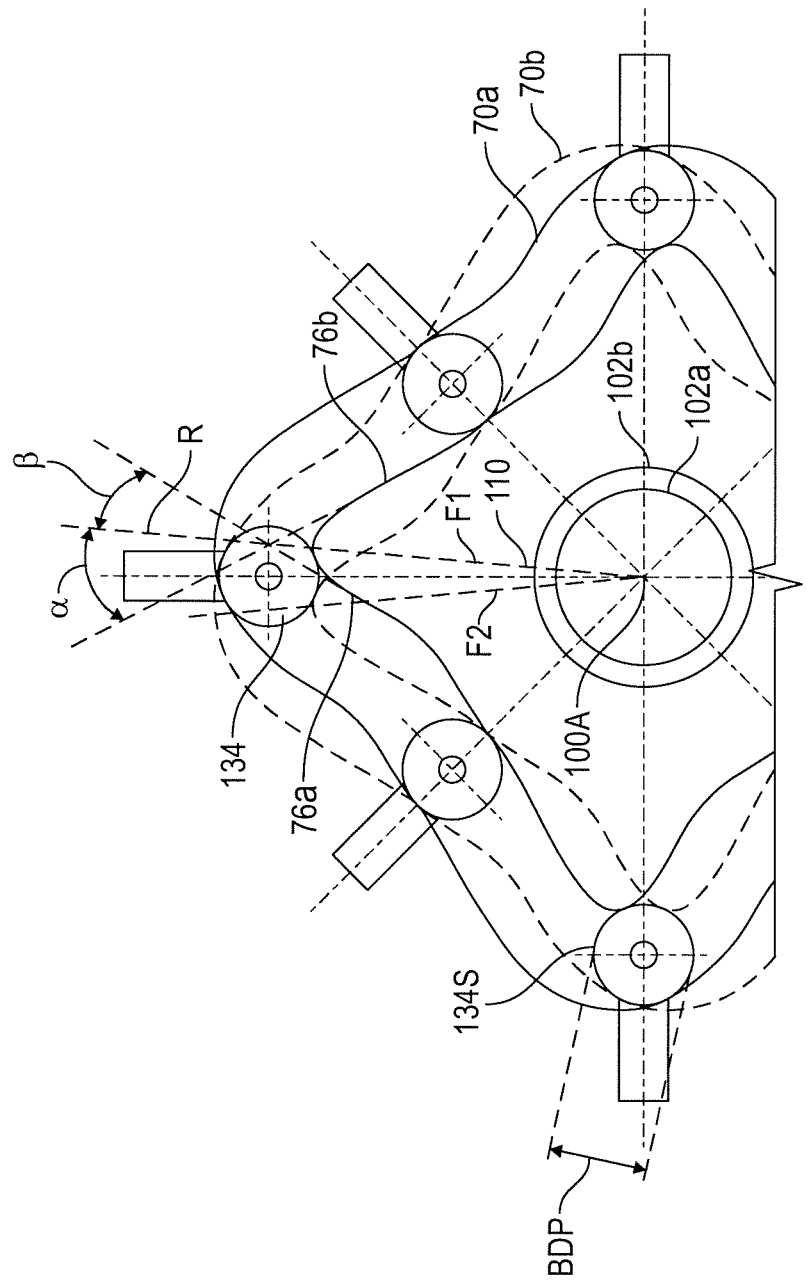
FIG. 14A depicts an enlarged plan view two identical, but facing drive cams (mirrored) to illustrate the "drive" and "follower" angles, alpha ($\alpha$) and beta ($\beta$) of each lobe.

Referring briefly to FIGS. 14 and 14A, in the described embodiment, the cam profile of each lobed cam defines at least one "lobe" having a drive or "rise" surface, and a follower or "run" surface. Furthermore, the cam profile surface defines drive and follower angles, alpha ($\alpha$) and beta ($\beta$), respectively, relative to a radial line bifurcating the center of the respective lobed cam. Additionally, the radial line passes through, and is orthogonal to, the rotational axis of the counter-rotating drive shafts.

In the broadest sense of the invention, the drive and follower angles alpha ($\alpha$) and beta ($\beta$) are unequal, such that a bifurcating load may be conveyed to the lobed cams when the "bottom-dead-center" (BDC) of at least two face-to-face lobes are aligned. In the context used herein, a "bifurcating load" is a load applied to each of the cams in opposite directions. Generally, the load will be equal and opposite, however, a higher load may be applied to one of the lobes depending upon the angle of the cam surface relative to the radial input from the reciprocating input shaft, e.g., the piston shaft. More specifically, as described in the Background of the Invention, should the lobes come to rest at a critical rotational position, i.e., when the bottom-dead-center (BDC) of at least two face-to-face lobes are aligned (See FIG. 8C), then a radial power source may be unable to develop the necessary bifurcating load to drive the lobed cams in opposite directions. By effecting unequal drive and follower angles alpha ($\alpha$) and beta ($\beta$), a pair of face-to-face lobed cams develop a small valley between the top-dead-center positions of at least two of the scissoring cam plates. Viewed yet another way, when the troughs of at least one of the lobes are aligned on one side of the rotational axis, the crests of at least one of the lobes on the opposite side (i.e., the other side) of the rotational axis will be separated by an arc length L. In the described embodiment, the arc length L may be evaluated by the relationship (1.0) below:

$$L = 2R(|\alpha| + |\beta|) \qquad (1.0)$$

wherein alpha $|\alpha|$ is the absolute value of the drive angle, beta $|\beta|$ is the absolute value of the follower angle, and R is the radius from the rotational axis to the crest of the lobe (or point of contact where an input bearing of an input drive piston makes contact with the cam surface). In a drive train employing four lobes, the sum of the driver and follower angles, α and β, respectively, will be ninety degrees (90°) or three hundred and sixty degrees (360°) with a divisor of four (4). Similarly, a drive train having six (6) lobes will employ driver and follower angles which, when summed, equal sixty degrees (60°). It should be appreciated that the arc length 2R|α|°2R|β|, is greater than the separation distance which may be caused by machining or manufacturing tolerances developed between these points during fabrication. Accordingly, as the arc length increases, the ability to drive the cam plates in opposite directions is increased such that a lower force is required to bifurcate the cam plates in opposite directions.

Still referring to FIGS. 14 and 14A, a simpler way of thinking about the asymmetric cam system is that the TDC and BDC positions of the apex and trough are not equally spaced within each lobe. In a four lobe system divided into 4 separate 90 degree quadrants a symmetrical cam would have an apex at 0 degrees, a trough at 45 degrees and rising up to another apex at 90 degrees. This symmetrical cam is shown in FIGS. 1-8. However, as noted, when the TBC and BDC positions align on the facing cams, the followers end up in "limbo" positions where they can potentially move either way. By shifting the BDC position of the trough to an asymmetric position, the followers are always positioned along an angled drive surface on one, or the other of the drive cams. As best seen in FIG. 14, the exemplary asymmetry is split in the quadrant at 50 degrees and 40 degrees with the follower 134 being located at the symmetric 45 degree position. This asymmetric shift of the BDC position results in the unequal drive and follower angles alpha (α) and beta (β) as best illustrated in FIG. 14a. Accordingly, as the cams 70a and 70b rotate, the TDC's and BDC's are never aligned with the symmetrical followers at the same time.

This feature will become apparent in view of the following detailed description and drawings.

FIGS. 11-13 depict various embodiments of the inventive drive train 100 wherein FIG. 11 depicts a profile view of a drive train 100a having a pair of cam plates 70a, 70b disposed on opposite sides of the center body 40. The cam plates 70a, 70b may be bearing mounted to the center body 40, i.e., via roller bearings (not shown) along an inner periphery of the central body 40, and contained within a cavity created by the end plates 46a, 46b (shown in phantom in each of the FIGS. 11-13). The cam plates 70a, 70b include a plurality of lobes (not shown) as previously described for receiving a linear power input from a piston drive shaft 30. In the described embodiment, the central body 40 includes an aperture 64A which is aligned with an aperture 64B of one of the cam plates 70A and/or with an aperture 12A of one of the end plates 46a, 46b. As such, a first output shaft 102a may be affixed to the first cam plate 70a for rotation in a first direction about an axis 100A and a second output drive 102b shaft may be affixed to the second cam plate 70b for rotation in an opposite direction about the same axis 100A.

In FIG. 11, a first output shaft 102a is disposed through, coaxial with, and counter-rotating relative to, a second output shaft 102b. The first and second output shafts 102a, 102b are disposed on the same side of the central body 40. As such, this configuration is ideally suited for helicopters, gyrocopters and wind-generating power sources having a power output on one side of the transmission. In FIG. 12, a first shaft 102b is coaxial with, and counter-rotating relative to the second shaft 102b. The first and second output shafts 102a, 102b are disposed on the opposite sides of the central body 40 and, as such, this configuration is ideally suited for power output devices which require spatial separation between the power outputs.

In each of the embodiments shown in FIGS. 11 and 12, the reciprocating input shafts 132a and 132b, respectively, drive the cam plates 70a, 70b by bearing surfaces 134S formed on, or in combination with, inverted tee-shaped cross-members 134. The tee-shaped cross-members 134a, 134b are orthogonal relative to the input shafts 132a, 132b and, as such, bending moment loads on the cross members 134a, 134b are balanced or equalized.

In FIG. 13, the cam plates 70a, 70b are disposed on the same side of the central body 40. Whereas each of the cam plates 70a, 70b in FIGS. 11 and 12, are face plates having bearing races which are machined into a face surface of each plate 70a, 70b, a central plate 70c allows for a cross member 134c to extend across to the outer plate 70b. Similar to the embodiment of FIG. 11, the first and second output shafts 102a, 102b are disposed on the same side of the central body 40. One difference, however, relates to the L-shaped cross-member 134c disposed orthogonal to the input shafts 134c.

Each of the drive train systems 100 depicted in FIGS. 11, 12 and 13 facilitate counter-rotation of the cam plates 70a, 70b and 70b, 70c. Counter-rotation may be initiated irrespective the initial rotational position of the cam plates 70a, 70b and 70b, 70c. As previously mentioned, this is made possible by unequal drive and follower angles, alpha (α) and beta (β), on each of the output cams 70a, 70b, and 70c. This geometry effects a trough or valley between at least one pair of face-to-face lobes such that a bifurcating load may be applied by an input bearing of a linear input drive shaft, described in greater detail below.

Referring again to FIG. 14A, an enlarged portion of the cam plates 70a, 70b are depicted to facilitate the viewing of the drive and follower cam surfaces 76a and 76b, respectively. The four-lobed configuration of the inventive drive train produces a lobe 110 which extends across a ninety degree (90°) arc. Therein, the drive cam surface 76a (shown in solid line) is disposed on one side of a lobe 110 while the follower cam surface 76b is disposed on the opposite side of the same lobe. The same is true of the lobe on the other cam 70b, but the drive and follower surfaces are reversed (mirrored). Both of the cam plates 70a and 70b are identical. However, when they are arranged in mirrored facing relation, the drive surfaces drive in opposing directions. While the ICE 10 described earlier disclosed cam profiles having equal drive and follower surfaces, i.e., defining equal drive and follower angles, the present disclosure defines unequal drive and follower surface angles, alpha (α) and beta (β), respectively. It should be appreciated that, in the context used herein, the angle alpha α refers to the angle of the drive surface 76a and will be used interchangeably herein. Furthermore, the angle beta β, refers to the angle of the follower surface 76b and will also be used interchangeably. The unequal drive and follower surfaces 76a, 76b eliminates the requirement for supplemental drive train apparatus or, "starter" apparatus to initiate counter-rotation of the cam plates 70a, 70b.

In the exemplary embodiment, the sum of the drive and follower surface angles, alpha (α) and beta (β), is greater than about four percent (4%) of the respective lobe angle. Accordingly, if a lobe extends through an arc of ninety degrees (90°), then the sum of alpha (α) and beta (β) should be greater than about four percent (4%) or about three and ⅗ths degrees, (3.6°). Stated yet another way, the cam profiles are configured such, when assembled in face-to-face relation, the drive and follower angles are asymmetric and exhibit at least about one and 4/5$^{ths}$ degrees (1.8°) of asymmetry. This corresponds to a cam profile wherein each lobe defines a drive angle (α) which is greater than about forty-seven degrees (47°) and a follower angle β which is less than about forty-three degrees (43°).

In another embodiment, the sum of alpha α and beta β should grow to about may greater than about ten percent (10%) or about ten and 9/10$^{ths}$ degrees, (10.9°) for a four-lobe cam. In the four-lobed embodiment illustrated in FIG. 14, the drive surface angle alpha α is about fifty degrees (50°) while the follower surface angle beta (β) is about forty degrees (40°) relative to a radial line RL which: (i) passes through the intersection of the drive and follower surfaces 76a, 76b and (ii) intersects the rotational axis 100A of the drive train system 100. It should be appreciated that a larger angle between the drive and follower surfaces 76a, 76b may be required as the diameter BDP of the piston input bearing 134 becomes larger as a consequence of the input loads acting on the piston input bearing 134. Irrespective of the diameter of the input bearing surface 134S, it is the objective of the invention, to configure the cam profile or cam surfaces such that a valley/trough is created between lobe crests (i.e., adjacent crests) on one side of the lobe configuration. The valley or trough must be sufficiently large to create a sufficiently large and efficient bifurcating load, (i.e., equal and opposite tangential loads F1, F2), between face-to-face cam lobes on opposing cams, to effect counter-rotation of the cam plates. It should be appreciated that these angles will vary greatly in view of the number of lobes.

Accordingly, when considering the arc inscribed by each of the lobes, the angle α along the drive surface will differ from the angle β along the follower surface. In one embodiment, the angles α and β will differ by at least four percent (4%). In another embodiment, the angles α and β will differ by at least ten percent (10%). In this embodiment, the diameter of the piston input bearings 134 is enlarged to mitigate loads on the contact surfaces (and on the members extending across the piston rods).

Figure 15B:
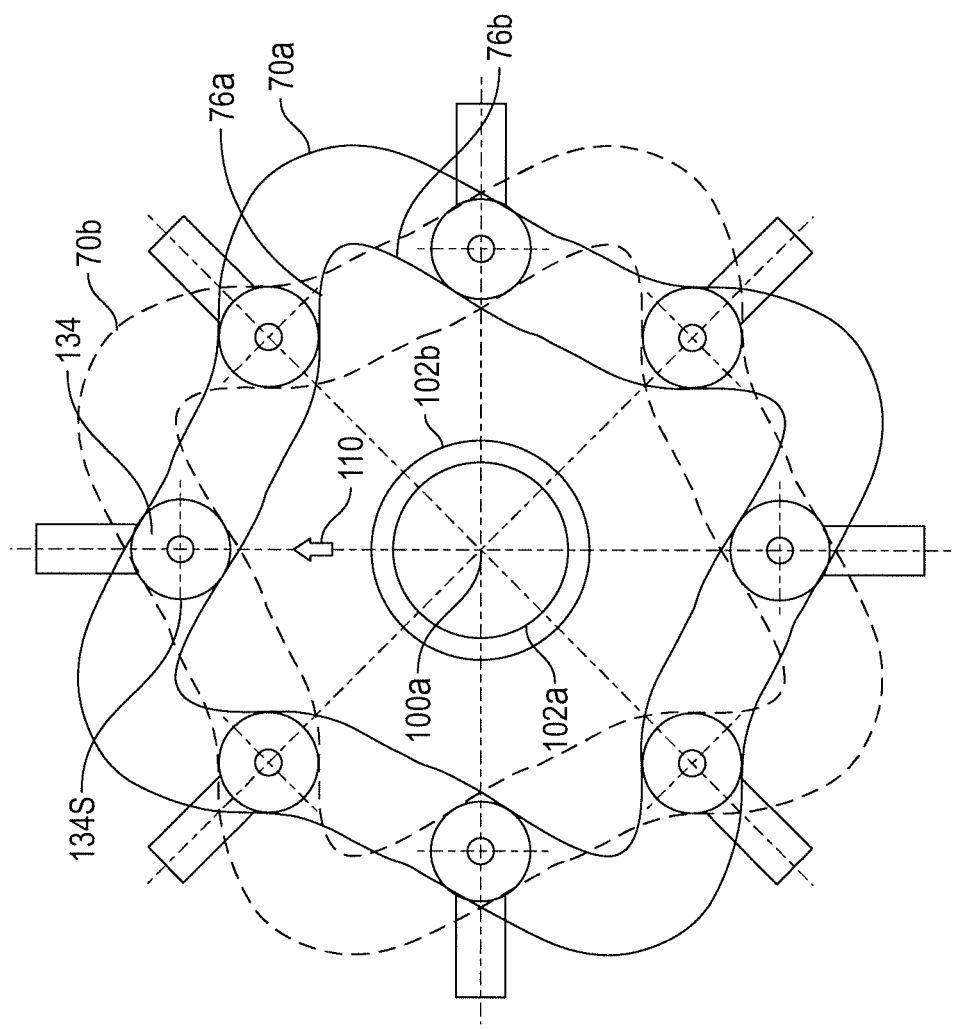
Figure 15D:
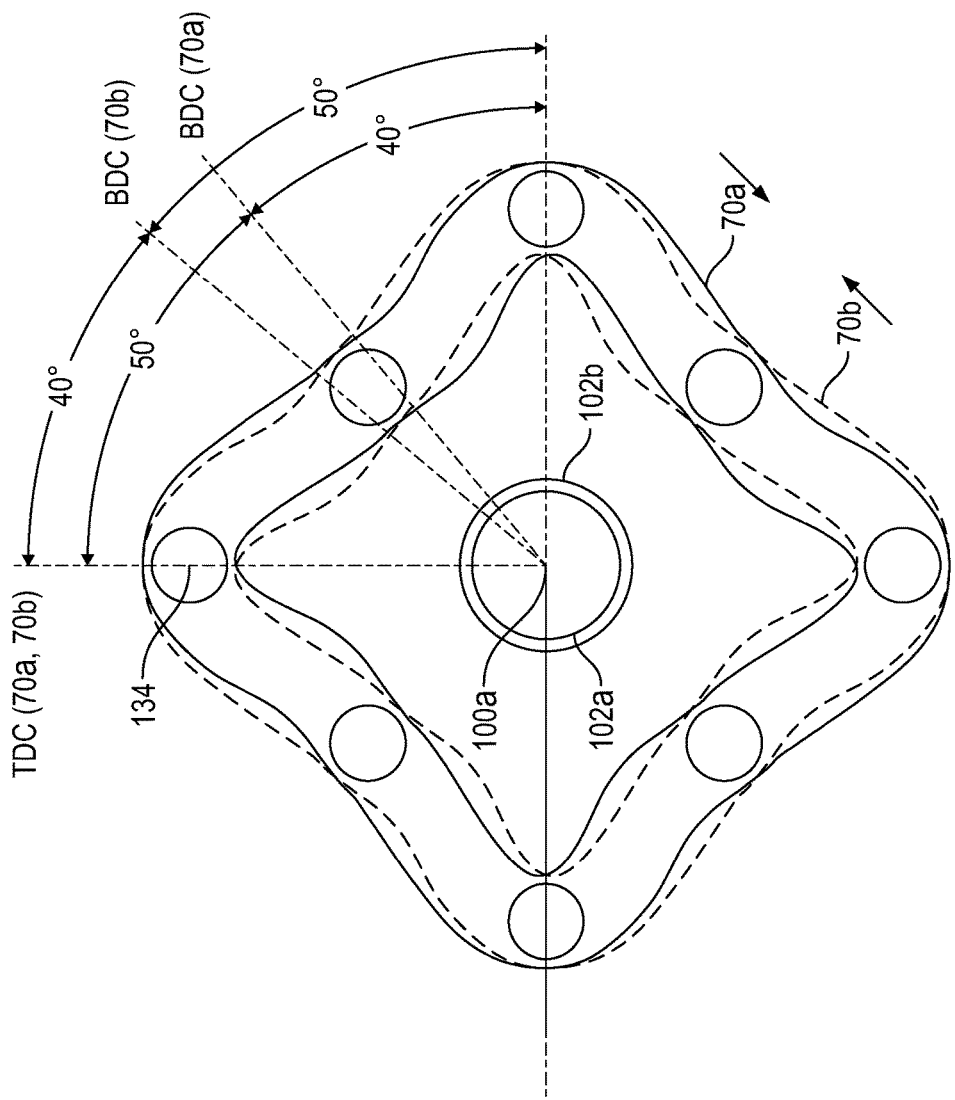
Figure 16:
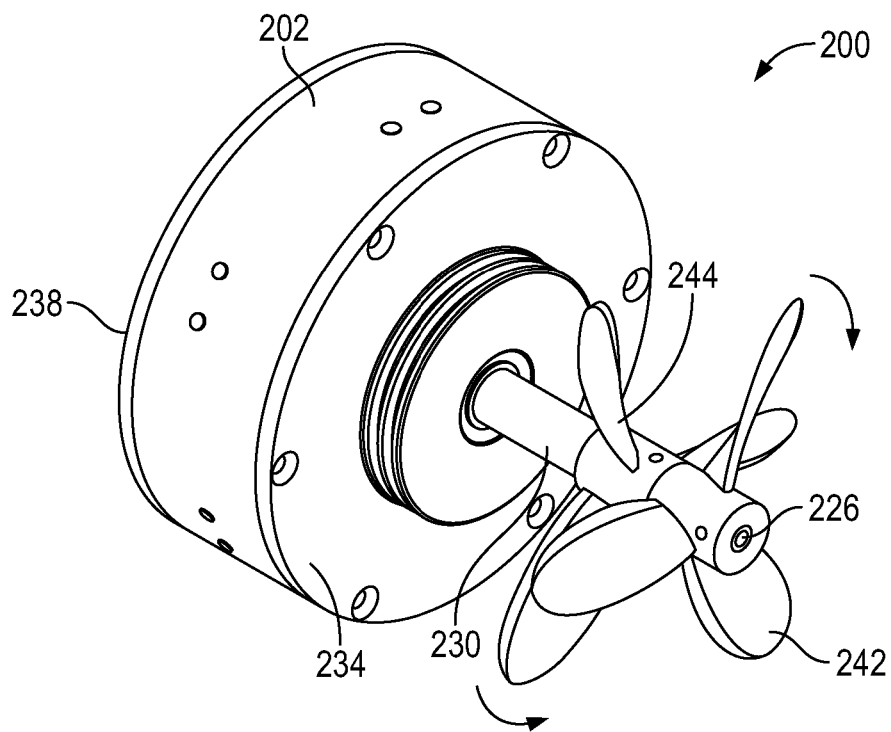
FIG. 16 is a perspective view of another exemplary embodiment of the drive system comprising a counter rotating transmission system for an underwater vehicle.
Figure 17:
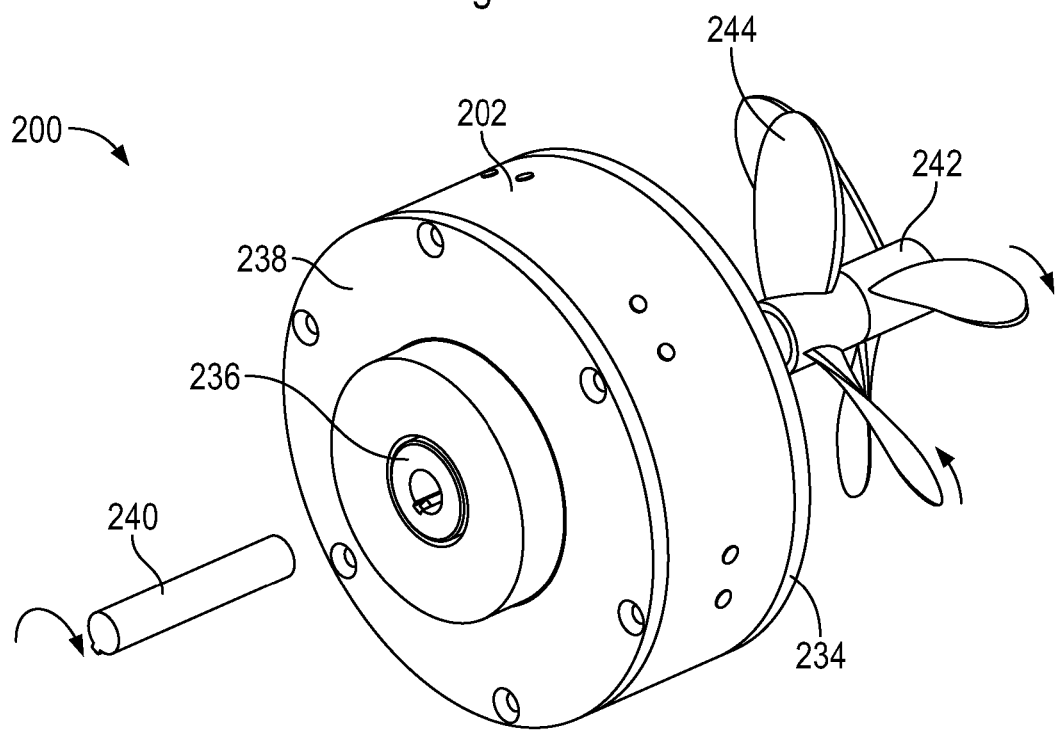
FIG. 17 is another perspective view thereof.
Figure 18:
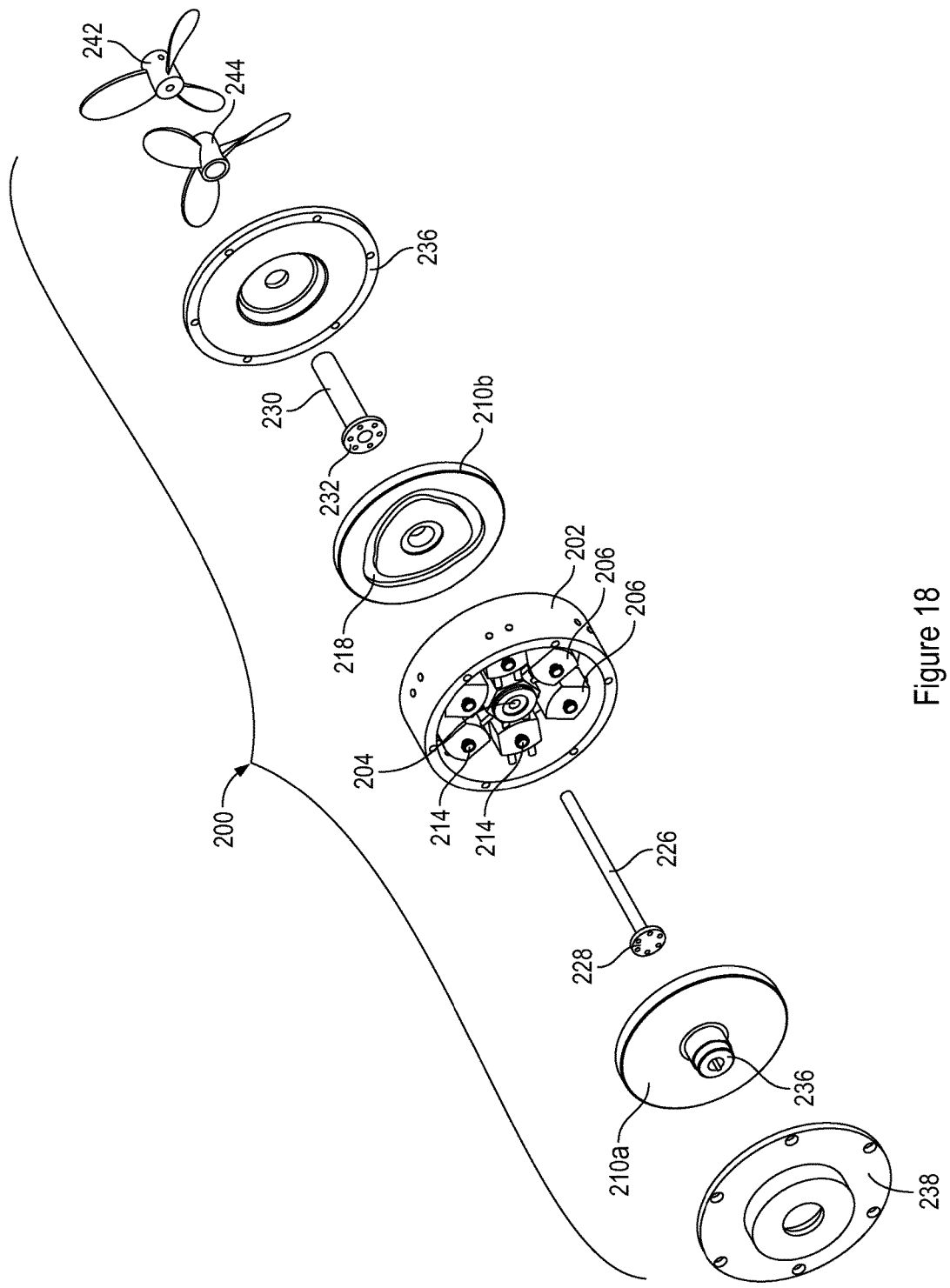
FIG. 18 is a first exploded perspective view thereof.
Figure 19:
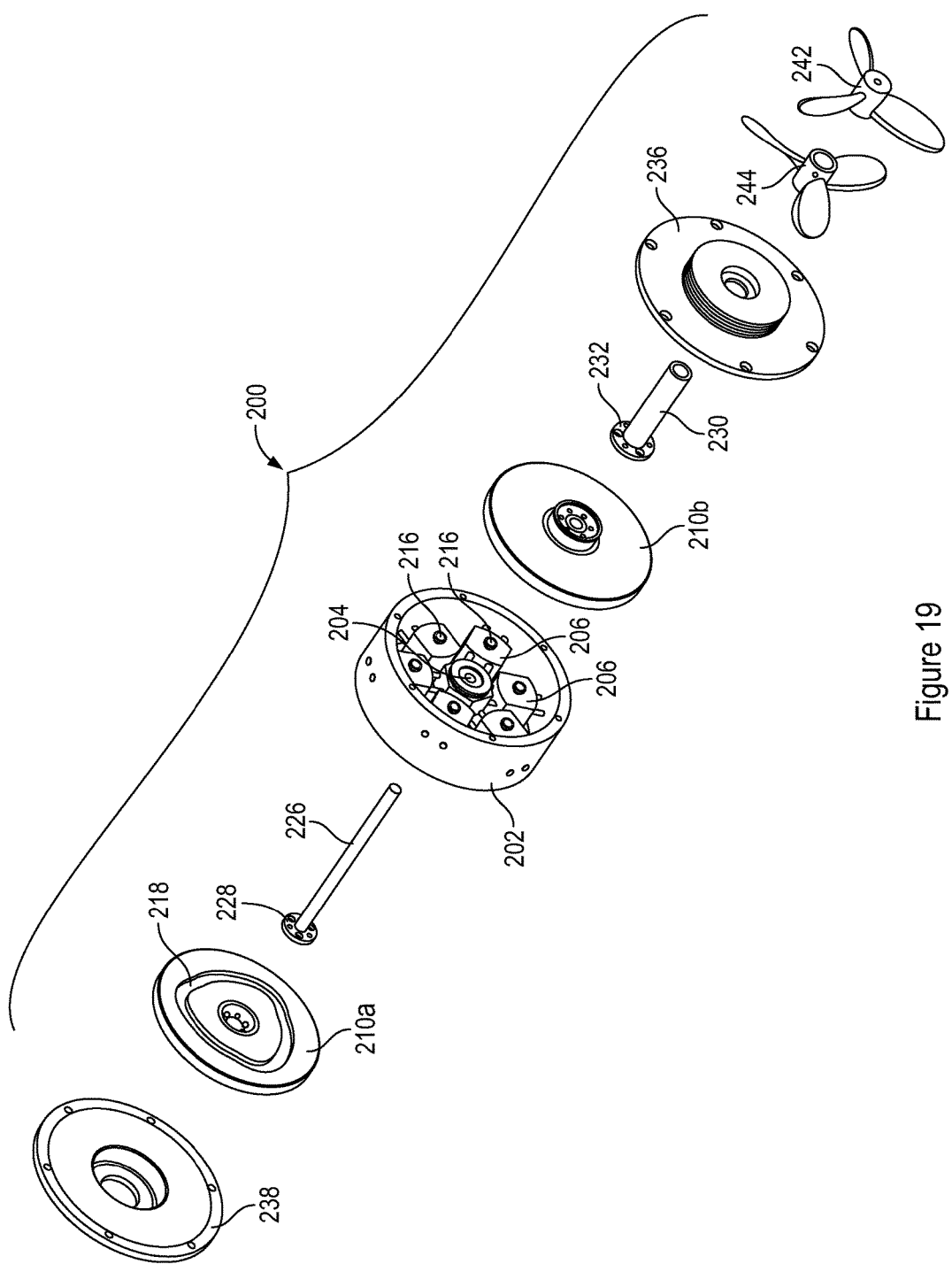
FIG. 19 is another exploded perspective view thereof.

In FIGS. 15a-15d, the cam plates 70a, 70b are shown progressing through an arc corresponding to ninety degrees (90°). The unequal drive and follower angles surfaces alpha α and beta β produce a trough or valley 140 (best seen in FIG. 15C) which allows the linear input bearing 134 to bifurcate the cam plates 70a, 70b as it drives radially downwardly. The downward force produces lateral forces on the cam surfaces 76a, 76b to drive the cam plate 70a, 70b in opposite directions about the rotational axis 100A. The FIGS. 15a-15d show two lobes, a first lobe 110 associated with cam plate 70a, and a second lobe 112 associated with the opposing cam plate 70b, wherein each rotates approximately forty-five 45 degrees corresponding to the power stroke of the input bearing 134. In FIG. 15a, the cams are in a position where the BDC positions of both cams are aligned (on the even followers 2, 4, 6, 8 (45 degree positions)), and the TDC positions are not aligned on the odd followers (1, 3, 5, 7 (0, 90, 180 and 270 degree positions). Instead, the flowers 134 are sandwiched in a v-slot between the opposing cam surfaces. FIGS. 15b and 15c illustrate intermediate positions where nothing is aligned and all of the followers 134 are engaged in v-shaped slots. FIG. 15d illustrates the TDC positions of both cams 70a and 70b aligned on the odd followers. However, it can also be seen that the BDC positions of both cams 70a, 70b are not aligned with the even followers thereby creating shallow v-shaped slots which are sufficient to continue driven rotation of the cams in opposite directions.

In the described embodiment, each cam 70a, 70b may have been two (2) and eight (8) lobes, however, in theory, there is no limit to the number of lobes which may be employed. The number of lobes may differ from one of the cams 70a, 70b to the other of the cams 70a, 70b. For example, one of the cams 70a, 70b may have four (4) lobes and the other of the cams 70a, 70b may have two (2) lobes. Further, one of the cams 70a, 70b may have four (4) lobes while the other of the cams 70a, 70b may have six (6) lobes.

Turning to FIGS. 16-22, another exemplary drive system 200 is illustrated as a counter-rotating transmission for an underwater vehicle (not shown). In this regard, the previous linear radial inputs from the ICE are replaced with a single axial input shaft driven by an electric motor (not shown). The present embodiment is ideally suited for use in an autonomous underwater vehicle (AUV) powered by an electric drive motor. Current AUV's utilize a single drive shaft and propeller and are subject to cavitation and roll issues as the propeller encounters frictional forces in the water. Roll is typically compensated for with angled fins to offset the roll forces. In other systems, counterrotation of twin propellers is provided with gearing systems. The present asymmetrical cam system ideally provides co-axial counter-rotation of twin output propellers based on a single co-axial input.

Generally, the drive system 200 comprises an annular housing 202, an axial hub 204 within the housing 202, a plurality of slide bodies 206 mounted on guides 208 extending radially between the axial hub 204 and the housing wall 202, and opposing input and output cam plates 210A, 210B bearing mounted for rotation within the housing 202.

Figure 20:
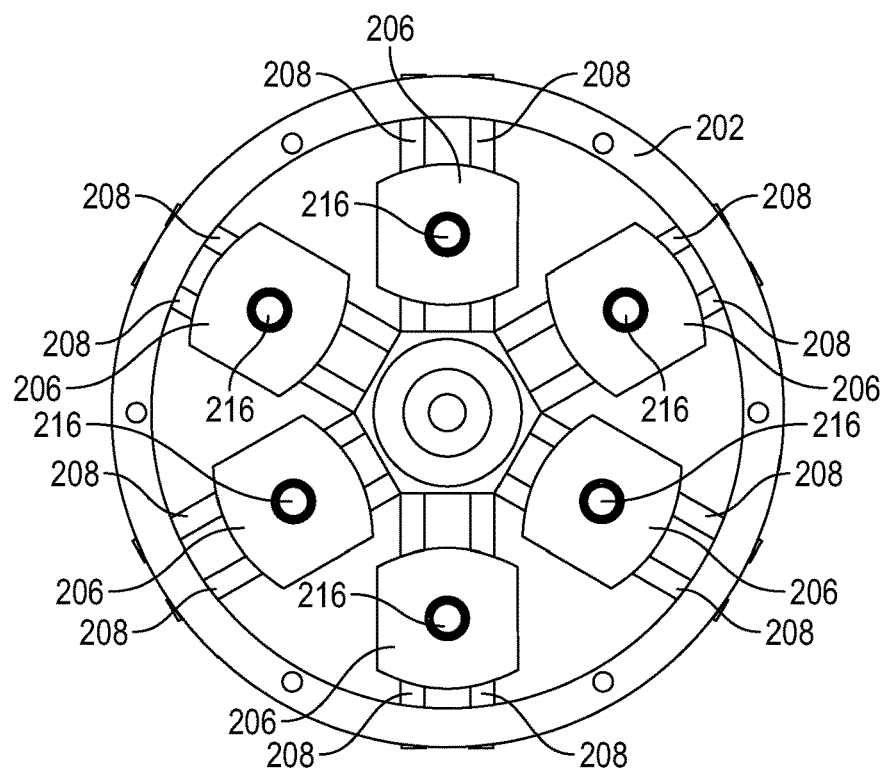
FIG. 20 is a plan view of the housing, followers and follower guides.
Figure 21:
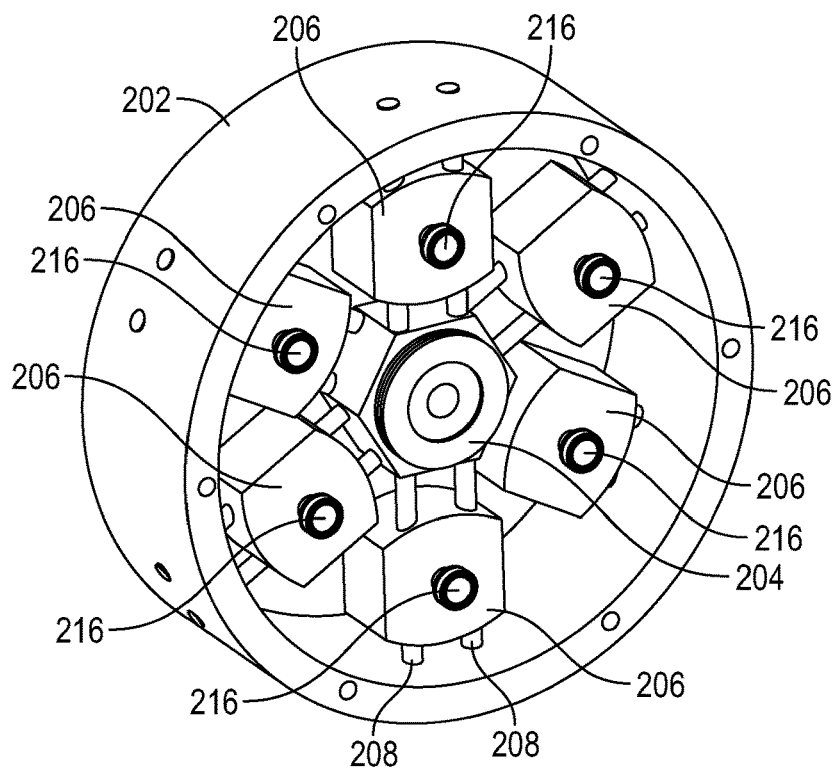
FIG. 21 is a perspective view thereof.

Referring to FIGS. 20 and 21, the axial hub 204 is suspended within the housing 202 by pairs of guide rods 208 extending between the hub 204 and the housing walls 202. The slide bodies 206 are slidably mounted on the guide rods 208 for reciprocating radial movement. The slide bodies 206 have an input side (see FIG. 18) with followers 214 (bearing rollers mounted on pins) and an output side (See FIGS. 19-21) with drivers 216 (bearing rollers mounted on pins).

Figure 22:
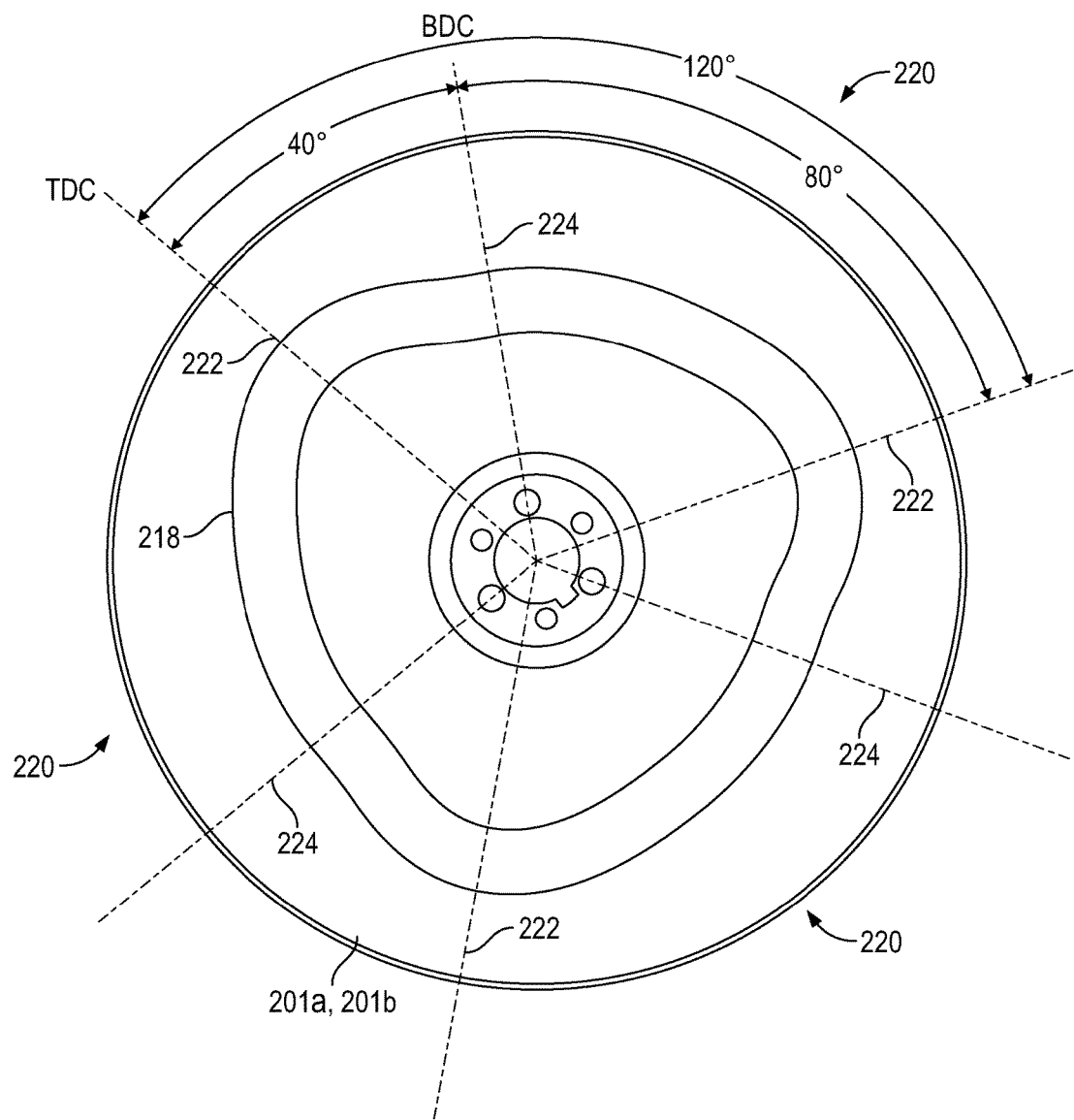
FIG. 22 is a plan view of an exemplary three (3) lobe drive cam as embodied in the present drive system.

Referring quickly to FIG. 22, the input and output cams 210A, 201B are identical, each having a cam surface 218 with plurality of cam lobes 220 extending about the 360 degree arc of rotation. In the exemplary embodiment, the cam surfaces 218 are illustrated with 3 lobes 220 and 6 slide bodies 206. As noted with the earlier embodiments, the number of lobes and slide bodies can vary according to the desired speed of rotation and operation. So long as the apex (TDC) 222 and trough (BDC) 224 are asymetrically distributed on the lobe quadrant 220, a smoothly operating counter-rotation effect is achieved. In the exemplary embodiment, the three apex points 222 are separated by 120 degrees and the trough points 224 are located only 40 degrees from the adjacent apex 222. This is a 2 to 1 (80/40) ratio which can vary according to desired operation. The depth of the trough relative to the apex results in varying drive and follow surface angles α and β as previously described hereinabove. Again, it is the asymmetry of the apex 222 and trough 224 points that generates the desired jam-free counter-rotation.

Turning back to FIGS. 18 and 19, the input cam plate 210A is received within the housing 202 on the input side of the slide bodies 206 with the cam surface 218 engaged with the followers 214 (See FIG. 18). As can be appreciated, rotation of the input cam plate 210A will drive reciprocating radial movement of the followers 214 and slide bodies 206. The output cam plate 210B is received within the housing 202 on the output side of the slide bodies 206 with the cam surface 218 engaged with the drivers 216 (See FIG. 19). As will be further appreciated, reciprocating radial movement of the slide bodies 206, in turn, drives counter rotation of the output cam plate 210B.

An axial inner output shaft 226 is engaged with the input cam plate 210A by a flange 228.

A tubular co-axial outer output shaft 230 is engaged with the output cam plate 210B by a flange 232. The inner output shaft 226 extends through the axial hub 204 and through the tubular coaxial outer output shaft. 230 and both the inner and outer output shafts extend through a cover plate 234 on the output side.

The input cam plate 210A includes a keyed shoulder 236 which extends through another cover plate 238 on the input side. The keyed shoulder 236 may selectively receive a keyed input shaft 240 (FIG. 16) of an electric (of combustion) drive motor (not shown).

An outer propeller 242 is mounted on the exposed end of the inner output shaft 226 and an inner propeller 244 is mounted on the end of the tubular outer output shaft 230.

Accordingly, rotation (clockwise) of the input drive shaft 240 drives rotation of the input cam plate 210A, the engaged inner output shaft 226 and the outer propeller 242 in the same clockwise direction. Rotation of the input cam plate 210A drives movement of the slide bodies 206 and corresponding counter-rotation (counter clockwise) of the output cam plate 210B, tubular outer output shaft 230, and inner propeller 244 (see FIG. 17).

In some underwater embodiments, the interior of the housing may be filled with oil, and pressurized by an oil/water diaphragm.

In another exemplary embodiment, the input and output sides of the drive system 200 could be used in a reverse arrangement using water flow (from a river or canal) to drive counter rotation of the propellers 242, 244 resulting in rotation of the drive shaft 240 to drive a generator. The exemplary system could provide a simple way to double input torque to drive an input shaft of a generator.

Other exemplary embodiments include mixers where the propellers are replaced with mixing blades.

In summary, the ICE 10 and drive train systems 100, 200 of the present invention provides a variety of advantages over prior art reciprocating piston engines and counter-rotating coaxial drive systems. Firstly, the drive trains 10, 100, 200 of the present invention are capable of delivering superbly high torque while maintaining a relatively low output speed. As previously mentioned, tug boats, helicopters and locomotives are prime applications for the ICE and drive train systems of the present invention. Inasmuch as the ICE and drive train system delivers these combinations of attributes, the need for intermediate gear/speed reducing devices is eliminated or significantly diminished and, so too, are the weight, complexity, cost, and maintenance of such devices. Moreover, the rotational speed of the output drive shafts may be readily changed simply by altering the number of drive cam lobes.

The drive train systems 100, 200 ensure counter-rotating output by varying the angles defined by the drive and follower surfaces. In one embodiment, the angles α and β will differ by at least four percent (4%) of the angle inscribed by the respective cam profile lobe. In another embodiment, the angles α and β will differ by at least ten percent (10%) of the angle inscribed by the respective cam profile lobe. Such asymmetry of the drive and follower surface angles eliminates the need for auxiliary drive mechanisms to provide a "starter" or "start-up" position of the drive cams.

Furthermore, as will be especially appreciated from the exploded views of the invention, the drive train systems 10, 100, 200 of the present invention employ a minimum number of moving components, thereby minimizing and improving reliability.

Although the invention has been described in terms of its various embodiments, one will appreciate that the teachings of the invention provide for various other embodiments which fall within the spirit and scope of the invention.

What is claimed is as follows:

1. A drive transmission comprising:
a housing having a rotational axis;
an axial hub within the housing;
a plurality of slide bodies mounted on guides extending radially between said axial hub and said housing,
each slide body having an input side with a follower and an output side with a driver;
input and output cam plates mounted for axial rotation within said housing in opposed facing relation, said input and output cam plates having identical cam surfaces with a plurality of lobes, each lobe having an asymmetrical lobe profile,
said input cam plate engaging the followers on the input sides of said slide bodies, said output cam plate engaging the drivers on the output sides of said slide bodies,
wherein rotation of said input cam plate causes an equal counter-rotation of said output cam plate;
an axial input shaft selectively engaged with said input cam;
an axial inner output shaft engaged with said input cam;
a tubular coaxial outer output shaft engaged with said output cam,
wherein rotation of said input shaft drives rotation of said axial inner output shaft and counter-rotation of said coaxial outer output shaft.

2. The drive transmission of claim 1 wherein said cam surfaces have 4 lobes.

3. The drive transmission of claim 2 wherein said plurality of slide bodies comprises 8 slide bodies.

4. The drive transmission of claim 1 wherein said cam surfaces have 3 lobes.

5. The drive transmission of claim 4 wherein said plurality of slide bodies comprises 6 slide bodies.

6. The drive transmission of claim 1 further comprising an outer propeller mounted on said inner output shaft and an inner propeller mounted on said outer output shaft.

7. A drive transmission comprising:
a housing having a rotational axis;
an axial hub within the housing;
a plurality of slide bodies mounted radially between said axial hub and said housing,
each slide body having an input side with a follower and an output side with a driver;
input and output cam plates mounted for axial rotation within said housing in opposed facing relation, said input and output cam plates having identical cam surfaces with a plurality of lobes, each lobe having an asymmetrical lobe profile,
said input cam plate engaging the followers on the input sides of said slide bodies, said output cam plate engaging the drivers on the output sides of said slide bodies;
an input driving rotation of said input cam plate, wherein rotation of said input cam plate causes an equal counter-rotation of said output cam plate;
an axial inner output shaft engaged with said input cam;
a tubular coaxial outer output shaft engaged with said output cam, wherein rotation of said input cam plate drives rotation of said axial inner output shaft and counter-rotation of said coaxial outer output shaft.

\* \* \* \* \*